(12) United States Patent
Yamamoto et al.

(10) Patent No.: US 10,381,640 B2
(45) Date of Patent: Aug. 13, 2019

(54) NEGATIVE ELECTRODE ACTIVE MATERIAL

(71) Applicant: NIPPON STEEL & SUMITOMO METAL CORPOATION, Tokyo (JP)

(72) Inventors: Sukeyoshi Yamamoto, Nishinomiya (JP); Noriyuki Negi, Futtsu (JP); Tatsuo Nagata, Ikeda (JP); Koji Moriguchi, Nishinomiya (JP); Mitsuharu Yonemura, Takarazuka (JP); Tomoyuki Kakeshita, Suita (JP); Tomoyuki Terai, Suita (JP); Takashi Fukuda, Kusatsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 752 days.

(21) Appl. No.: 14/419,969

(22) PCT Filed: Aug. 27, 2013

(86) PCT No.: PCT/JP2013/005061
§ 371 (c)(1),
(2) Date: Feb. 6, 2015

(87) PCT Pub. No.: WO2014/034104
PCT Pub. Date: Mar. 6, 2014

(65) Prior Publication Data
US 2015/0200392 A1    Jul. 16, 2015

(30) Foreign Application Priority Data

Aug. 27, 2012 (JP) ................................. 2012-186159

(51) Int. Cl.
*C22C 9/02* (2006.01)
*C22C 9/04* (2006.01)
(Continued)

(52) U.S. Cl.
CPC ................. *H01M 4/38* (2013.01); *C22C 9/02* (2013.01); *C22C 9/04* (2013.01); *C22C 30/02* (2013.01);
(Continued)

(58) Field of Classification Search
CPC ............... H01M 4/38; H01M 2220/20; H01M 2220/30; H01M 2004/027; C22C 9/02;
(Continued)

(56) References Cited

U.S. PATENT DOCUMENTS 10,038,184 B2 * 7/2018 Yamamoto ................ C22C 9/00
2003/0118908 A1 * 6/2003 Ishikawa ............... H01M 4/364
429/231.8
(Continued)

FOREIGN PATENT DOCUMENTS

| CN | 101 071 851 | 11/2007 | |
|---|---|---|---|
| EP | 0997543 A1 * | 10/1999 | .............. C22C 1/04 |
| EP | 1 043 789 | 10/2000 | |

OTHER PUBLICATIONS

Schetky, L.M., "Shape-Memory Alloys," Kirk-Othmer Encyclopedia of Chemical Technology, 2000.*
(Continued)

*Primary Examiner* — Keith Walker
*Assistant Examiner* — John A Hevey
(74) *Attorney, Agent, or Firm* — Clark & Brody

(57) ABSTRACT

Provided is a negative electrode active material that can improve the capacity per volume and charge-discharge cycle characteristics of a nonaqueous electrolyte secondary battery represented by a lithium ion secondary battery. The negative electrode active material according to the present embodiment contains an alloy phase. The alloy phase undergoes thermoelastic diffusionless transformation when releasing or occluding metal ions. The negative electrode active (Continued)

material of the present embodiment is used in a nonaqueous electrolyte secondary battery. Thermoelastic diffusionless transformation refers to so-called thermoelastic martensitic transformation.

4 Claims, 10 Drawing Sheets

(51) Int. Cl.
    *H01M 4/02*     (2006.01)
    *H01M 4/38*     (2006.01)
    *C22C 30/02*     (2006.01)
    *C22C 30/04*     (2006.01)
    *C22C 30/06*     (2006.01)
    *C22C 19/00*     (2006.01)
    *C22C 19/03*     (2006.01)

(52) U.S. Cl.
    CPC .............. *C22C 30/04* (2013.01); *C22C 30/06* (2013.01); *C22C 19/007* (2013.01); *C22C 19/03* (2013.01); *H01M 2004/027* (2013.01); *H01M 2220/20* (2013.01); *H01M 2220/30* (2013.01)

(58) Field of Classification Search
    CPC ........... C22C 9/04; C22C 30/02; C22C 30/04; C22C 30/06; C22C 19/007; C22C 19/03
    See application file for complete search history.

(56) References Cited

U.S. PATENT DOCUMENTS

| | | | |
|---|---|---|---|
| 2008/0233479 | A1 | 9/2008 | Sung et al. |
| 2011/0236756 | A1 | 9/2011 | Joo et al. |
| 2013/0224632 | A1* | 8/2013 | Roumi .................. H01M 2/166 429/516 |
| 2017/0170461 | A1* | 6/2017 | Yamamoto ............ H01M 4/364 |
| 2017/0170462 | A1* | 6/2017 | Yamamoto ............ H01M 4/364 |
| 2017/0170463 | A1* | 6/2017 | Usui ...................... H01M 4/364 |
| 2017/0170470 | A1* | 6/2017 | Yamamoto .............. H01M 4/38 |
| 2017/0170471 | A1* | 6/2017 | Yamamoto .............. H01M 4/38 |

OTHER PUBLICATIONS

Tamura, et al., "Study on the anode behavior of Sn and Sn—Cu alloy thin-film electrodes," J. Power Sources, 107 (2002), pp. 48-55.*
Lee et al., "First-principles high-throughput screening of shape-memory alloys based on energetic dynamical, and structural properties," Condensed Matter, Submitted Feb. 9, 2017.*
Saunders et al., "The Cu—Sn (Copper-Tin) System," Bulletin of Alloy Phase Diagrams, vol. 11, No. 3, 1990, pp. 278-287. (Year: 1990).*
S. Miura et al., "Shape Memory Effects in Alloys", Plenum Press, N.Y., (1975) 389.
Finke et al., "Characterization and . . . Current Oscillations", Journal of the Electrochemical Society, vol. 152, No. 12, Oct. 26, 2005.
Beattie et al., "Single-Bath Electrodeposition . . . Cu[sub 1-x] Sn [sub x] Alloys", Journal of the Electrochemical Society, vol. 150, No. 7, May 12, 2003.
Kim et al., "Nanosized Sn—Cu—B alloy . . . lithium batteries", Journal of Power Sources, vol. 104, No. 2, 15, 2002.
Furtauer et al., "The Cu—Sn phase . . . experimental results", Intermetallics, vol. 34, Nov. 9, 2012.
Kennon et al., "Martensitic Transformations in [beta]1 Cu—Sn Alloys", Transactions of the Japan Institute of Metals, vol. 13, No. 5, Dec. 31, 1972.
Tu et al., "Kinetics of . . . thin films", Acta Metallurgica, vol. 30, No. 5, May 1, 1982.
Sulaiman, S., "Crystallographic relationships in copper-aluminum-nickel shape memory alloys", University of Wollongong Research Online, 1994.
Hu et al., "Microstructure and electrochemical properties of electron-beam deposited Sn—Cu thin film anodes for thin film lithium ion batteries", Electrochimica Acta, Elsevier Science Publishers, vol. 53, No. 8, Dec. 3, 2008, pp. 3377-3385.

* cited by examiner

NEGATIVE ELECTRODE ACTIVE MATERIAL

TECHNICAL FIELD

The present invention relates to an electrode active material, and more particularly to a negative electrode active material.

BACKGROUND ART

Recently, small electronic appliances such as home video cameras, note PCs, and smart phones have become widespread, and attaining higher capacity and longer service life of batteries has become a technical problem.

Given that hybrid vehicles, plug-in hybrid vehicles, and electric vehicles will be further spread, size reduction of batteries is also a technical problem.

At present, graphite-based negative electrode active materials are utilized for lithium ion batteries. However, graphite-based negative electrode active materials have technical problem as described above.

Accordingly, alloy-based negative electrode active materials have gained attention, which have higher capacity than those of the graphite-based negative electrode active materials. As an alloy-based negative electrode active material, silicon (Si)-based negative electrode active materials and tin (Sn)-based negative electrode active materials are known. To realize a lithium ion battery having a smaller size and a longer life, various studies have been conducted on the above described alloy-based negative electrode active materials.

However, an alloy-based negative electrode active material repeatedly undergoes large expansion and contraction in volume at the time of charging/discharging. For that reason, the capacity of the alloy-based negative electrode active material is prone to deteriorate. For example, a volume expansion/contraction rate of graphite associated with charging is about 12%. In contrast, the volume expansion/contraction rate of Si single substance or Sn single substance associated with charging is about 400%. For this reason, if a negative electrode plate of Sn single substance is repeatedly subjected to charging and discharging, significant expansion and contraction occur, thereby causing cracking in negative electrode compound which is applied on the current collector of the negative electrode plate. Consequently, the capacity of the negative electrode plate sharply decreases. This is chiefly caused by the fact that some of the active substances are freed due to volume expansion/contraction and thereby the negative electrode plate loses electron conductivity.

US2008/0233479A (Patent Literature 1) proposes a method for solving the above described problem of an alloy-based negative electrode active material. To be specific, the negative electrode material of Patent Literature 1 includes a Ti—Ni superelastic alloy, and Si particles formed in the superelastic alloy. Patent Literature 1 describes that a large expansion/contraction change of Si particle which occur following occlusion and release of lithium ions can be suppressed by a superelastic alloy.

However, it is questionable that the technique disclosed in Patent Literature 1 sufficiently improves the charge-discharge cycle characteristics of the secondary battery. Most of all, it may be highly difficult to actually produce the negative electrode active material proposed by Patent Literature 1.

CITATION LIST

Patent Literature

Patent Literature 1: US2008/0233479A

SUMMARY OF INVENTION

It is an objective of the present invention to provide a negative electrode active material which is utilized for nonaqueous electrolyte secondary batteries represented by a lithium ion secondary battery and can improve the capacity per volume and charge-discharge cycle characteristics thereof.

The negative electrode active material according to the present embodiment contains an alloy phase. The alloy phase undergoes thermoelastic diffusionless transformation when releasing or occluding metal ions.

DESCRIPTION OF EMBODIMENTS

Figure 1:
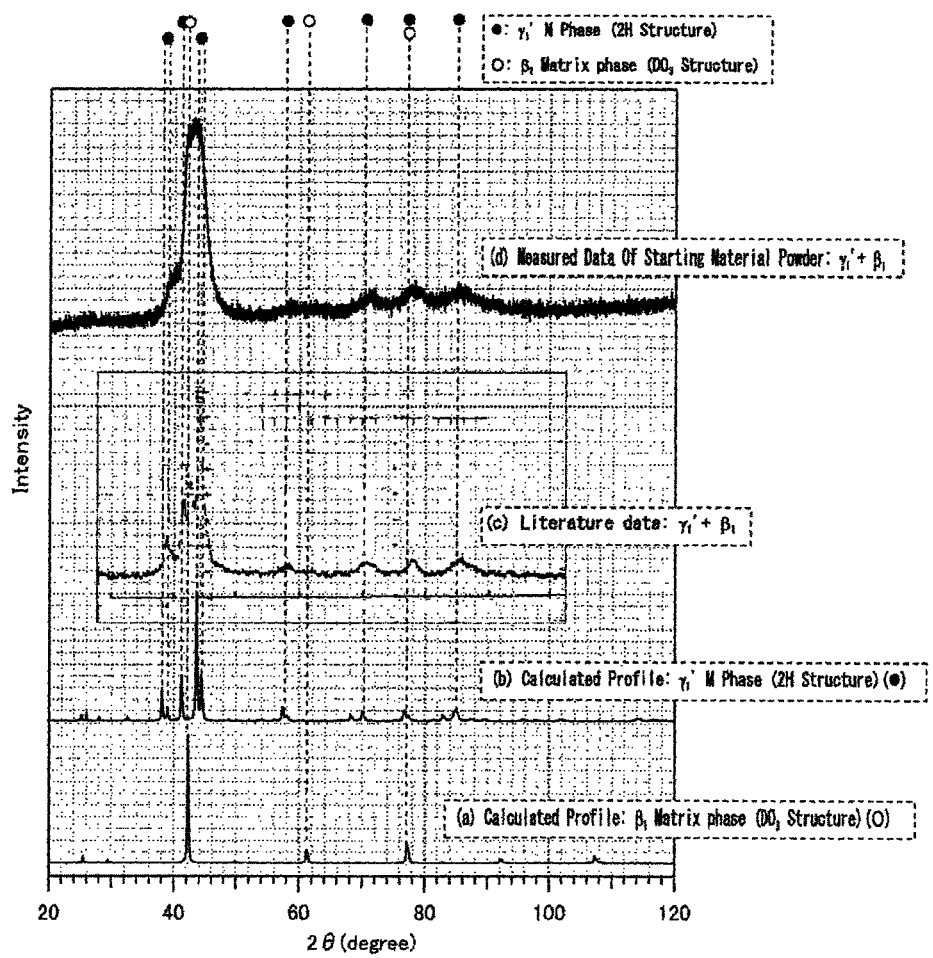
FIG. 1 is a diagram illustrating an X-ray diffraction profile of Cu-15.5 at % Sn alloy among Examples, and a simulation result by Rietveld method.

Hereinafter, with reference to the drawings, embodiments of the present invention will be described in detail. Like parts or corresponding parts in the drawings are given a like reference symbol and description thereof will not be repeated.

The negative electrode active material according to the present embodiment contains an alloy phase. The alloy phase undergoes thermoelastic diffusionless transformation when releasing or occluding metal ions.

A "negative electrode active material" referred herein is preferably a negative electrode active material for nonaqueous electrolyte secondary batteries. A "thermoelastic diffusionless transformation" referred herein is so-called thermoelastic martensitic transformation. A "metal ion" refers to, for example, a lithium ion, magnesium ion, sodium ion, and the like. A preferable metal ion is lithium ion.

This negative electrode active material may contain other phases different from the above described alloy phases. The other phases include, for example, a silicon (Si) phase, a tin (Sn) phase, other alloy phases (alloy phases which do not undergo thermoelastic diffusionless transformation) excepting the above described alloy phases, and the like.

Preferably, the above described alloy phases are main components (main phases) of the negative electrode active material. "Main component" refers to a component which occupies not less than 50% by volume. The alloy phase may contain impurities to the extent that the spirit of the present invention is unimpaired. However, the impurities are contained preferably as little as possible.

A negative electrode formed of a negative electrode active material of the present embodiment has a higher volumetric discharge capacity (discharge capacity per volume) than that of a negative electrode made of graphite, when used in a nonaqueous electrolyte secondary battery. Further, a nonaqueous electrolyte secondary battery using a negative electrode containing a negative electrode active material of the present embodiment has a higher capacity retention ratio than one using a conventional alloy-based negative electrode. Therefore, the negative electrode active material has a potential to sufficiently improve the charge-discharge cycle characteristics of the nonaqueous electrolyte secondary battery.

A possible reason why the capacity retention ratio is high is that strain due to expansion/contraction that occurs at the time of charging/discharging is relaxed by thermoelastic diffusionless transformation.

The alloy phase may be of any one of the following types 1 to 4.

The alloy phase of type 1 undergoes thermoelastic diffusionless transformation when occluding metal ions, and undergoes reverse transformation when releasing metal ions. In this case, the alloy phase is a matrix phase in a normal state.

The alloy phase of type 2 undergoes reverse transformation when occluding metal ions, and undergoes thermoelastic diffusionless transformation when releasing metal ions. In this case, the alloy phase is a martensite phase in a normal state.

The alloy phase of type 3 undergoes supplemental deformation (slip deformation or twin deformation) when occluding metal ions, and returns to the original martensite phase when releasing metal ions. In this case, the alloy phase is a martensite phase in a normal state.

The alloy phase of type 4 transforms from a martensite phase to another martensite phase when occluding metal ions, and returns to the original martensite phase when releasing metal ions. In this case, the alloy phase is a martensite phase in a normal state.

In the case of the alloy phase of type 1, preferably, the crystal structure of the alloy phase after thermoelastic diffusionless transformation is either of 2H, 3R, 6R, 9R, 18R, M2H, M3R, M6R, M9R, and M18R in the Ramsdell notation, and the crystal structure of the alloy phase after reverse transformation is $DO_3$ in the Strukturbericht notation. More preferably, the crystal structure of the alloy phase after thermoelastic diffusionless transformation is the above described 2H, and the crystal structure of the alloy phase after reverse transformation is the above described $DO_3$.

In the case of the alloy phase of type 1, preferably, the negative electrode active material contains Cu and Sn, and also contains the above described 2H structure after thermoelastic diffusionless transformation, and the above described $DO_3$ structure after reverse transformation.

The above described negative electrode active material may contain one or more selected from the group consisting of Ti, V, Cr, Mn, Fe, Co, Ni, Zn, Al, Si, B, and C, and Sn, with balance being Cu and impurities.

The above described negative electrode active material may contain one or more selected from the group consisting of δ phase of F-Cell structure, ε phase of 2H structure, η' phase of monoclinic crystal, and a phase having $DO_3$ structure, each including site deficiency.

All of these δ phase, ε phase, η' phase, and phase having $DO_3$ structure, each including site deficiency form a storage site and a diffusion site of metal ions (Li ions, etc.) in the negative electrode active material. Thereby, the volumetric discharge capacity and the cycle characteristics of the negative electrode active material are further improved.

In the above described negative electrode active material, a volume expansion ratio or volume contraction ratio of a unit cell of the above described alloy phase before and after the phase transformation is preferably not more than 20%, and more preferably not more than 10%. The volume expansion ratio of unit cell is defined by the following Formula (1), and the volume contraction ratio of unit cell is defined by the following Formula (2).

$$\text{(Volume expansion ratio of unit cell)} = [(\text{volume of unit cell when metal ions are occluded}) - (\text{volume of unit cell when metal ions are released})] / (\text{volume of unit cell when metal ions are released}) \times 100 \quad (1)$$

$$\text{(Volume contraction ratio of unit cell)} = [(\text{volume of unit cell when metal ions are occluded}) - (\text{volume of unit cell when metal ions are released})] / (\text{volume of unit cell when metal ions are occluded}) \times 100 \quad (2)$$

The volume of unit cell at the time of releasing, which corresponds to a crystal lattice range of unit cell at the time of occluding, is substituted into "volume of unit cell when metal ions are released" in Formulas (1) and (2).

The above described negative electrode active material can be used as active material for making up an electrode, particularly electrode of a nonaqueous electrolyte secondary battery. An example of the nonaqueous electrolyte secondary battery is a lithium ion secondary battery.

Hereinafter, negative electrode active materials according to the present embodiment will be described in detail.

<Negative Electrode Active Material>

A negative electrode active material relating to the present embodiment of the invention contains an alloy phase. The alloy phase undergoes thermoelastic diffusionless transformation when releasing metal ions represented by Li ions, or occluding the metal ions, as described above. The thermoelastic diffusionless transformation is also called as thermoelastic martensitic transformation. Hereinafter, in the present description, the thermoelastic martensitic transformation is simply referred to as "M transformation" and the martensite phase as "M phase". An alloy phase that undergoes M transformation when occluding or releasing metal ions is also referred to as a "specific alloy phase".

The specific alloy phase is dominantly made up of at least one of M phase and a matrix phase. The specific alloy phase repeats occlusion/release of metal ions at the time of charging/discharging. Then, the specific alloy phase undergoes M transformation, reverse transformation, supplemental deformation, etc. in response to occlusion and release of metal ions. These transformation behaviors mitigate strain which is caused by expansion and contraction of the alloy phase when occluding and releasing metal ions.

The specific alloy phase may be of any one of the above described types 1 to 4. Preferably, the specific alloy phase is of type 1. That is, the specific alloy phase preferably undergoes M transformation when occluding metal ions, and undergoes reverse transformation when releasing metal ions.

The crystal structure of the specific alloy phase is not specifically limited. If the alloy phase is of type 1, and the crystal structure of the specific alloy phase (that is, a matrix phase) after reverse transformation is $\beta_1$ phase ($DO_3$ structure), the crystal structure of the specific alloy phase (that is, M phase) after M transformation is, for example, $\beta_1'$ phase ($M18R_1$ structure of monoclinic crystal or $18R_1$ structure of orthorhombic crystal), $\gamma_1'$ phase (M2H structure of monoclinic crystal or 2H structure of orthorhombic crystal), $\beta_1''$ phase (M18R, structure of monoclinic crystal or $18R_2$ structure of orthorhombic crystal), $\alpha_1'$ phase (M6R structure of monoclinic crystal or 6R structure of orthorhombic crystal), and the like.

If the crystal structure of the matrix phase of the specific alloy phase is $\beta_2$ phase (B2 structure), the crystal structure of M phase of the specific alloy phase is, for example, $\beta_2'$ phase (M9R structure of monoclinic crystal or 9R structure of orthorhombic crystal), $\gamma_2'$ phase (M2H structure of monoclinic crystal or 2H structure of orthorhombic crystal), and $\alpha_2'$ phase (M3R structure of monoclinic crystal or 3R structure of orthorhombic crystal).

If the matrix phase of the alloy phase has a face-centered cubic lattice, the crystal structure of M phase of the alloy phase has, for example, a face-centered tetragonal lattice, and a body-centered tetragonal lattice.

Such symbols as the above described 2H, 3R, 6R, 9R, 18R, M2H, M3R, M6R, M9R, and M18R are used as the method of denoting crystal structures of a layered construction according to Ramsdell's classification. The symbols H and R mean that respective symmetries in the direction perpendicular to the lamination plane are hexagonal symmetry and rhombohedral symmetry. If there is no M appended at the beginning, it means that the crystal structure is an orthorhombic crystal. If there is M appended at the beginning, it means that the crystal structure is a monoclinic crystal. Even if same classification symbols are used, there are cases in which distinction is made by the difference in the order of the layers. For example, since $\beta_1'$ phase and $\beta_1''$ phase, which are two kinds of M phase, have a different layered construction, there are cases in which they are distinguished by being denoted as $18R_1$ and $18R_2$, or $M18R_1$ and $M18R_2$ etc., respectively.

In General, M transformation and reverse transformation in normal shape memory effects and pseudoelastic effects often involve volume contraction or volume expansion. When a negative electrode active material relating to the present embodiment electrochemically releases or occludes metal ions (for example, lithium ions), it is considered that the crystal structure often changes in consistent with the phenomena of volume contraction or volume expansion in the direction of respective transformation.

However, the negative electrode active material according to the present embodiment will not be particularly limited by such restriction. When M transformation or reverse transformation occurs following occlusion and release of metal ions in the specific alloy phase, there may be generated other crystal structures than the crystal structure that appears at the time of ordinary shape memory effects and pseudoelastic effects.

When the specific alloy phase is of type 3, the specific alloy phase undergoes slip deformation or twin deformation following occlusion or release of metal ions. In slip deformation, since dislocation is introduced as the lattice defect, reversible deformation is difficult. Therefore, when the specific alloy phase is of type 3, it is preferable that twin deformation dominantly occurs.

[Chemical Composition of Negative Electrode Active Material]

The chemical composition of a negative electrode active material containing the above described specific alloy phase will not be particularly limited provided that the crystal structure at the time of M transformation and reverse transformation contains the above described crystal structures.

When the specific alloy phase is of type 1, the chemical composition of the negative electrode active material containing the specific alloy phase contains, for example, Cu (copper) and Sn (tin).

When the specific alloy phase is of type 1, preferably, the crystal structure of the specific alloy phase after reverse transformation caused by discharge of metal ions is $DO_3$ structure, and the crystal structure of the specific alloy phase after M transformation caused by occlusion of metal ions is 2H structure.

Preferably, the chemical composition of negative electrode active material contains Sn, with the balance being Cu and impurities. More preferably, the negative electrode active material contains 10 to 20 at % or 21 to 27 at % of Sn, with the balance being Cu and impurities, wherein the negative electrode active material contains 2H structure after M transformation, and $DO_3$ structure after reverse transformation. A more preferable Sn content in the negative electrode active material is 13 to 16 at %, 18.5 to 20 at %, or 21 to 27 at %.

The chemical composition of negative electrode active material may contain one or more selected from the group consisting of Ti, V, Cr, Mn, Fe, Co, Ni, Zn, Al, Si, B, and C, and Sn, with the balance being Cu and impurities.

Preferably, the chemical composition of the negative electrode active material in this case contains: Sn: 10 to 35 at %, and one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less, with the balance being Cu and impurities. The above described Ti, V, Cr, Mn, Fe, Co, Ni, Zn, Al, Si, B and C are optional elements.

A preferable upper limit of Ti content is 9.0 at % as described above. The upper limit of Ti content is more preferably 6.0 at %, and further preferably 5.0 at %. A lower limit of Ti content is preferably 0.1 at %, more preferably 0.5 at %, and further preferably at 1.0 at %.

A preferable upper limit of V content is 49.0 at % as described above. The upper limit of V content is more preferably 30.0 at %, further preferably 15.0 at %, and furthermore preferably 10.0 at %. A lower limit of V content is preferably 0.1 at %, more preferably 0.5 at %, and further preferably at 1.0 at %.

A preferable upper limit of Cr content is 49.0 at % as described above. The upper limit of Cr content is more preferably 30.0 at %, further preferably 15.0 at %, and furthermore preferably 10.0 at %. A lower limit of Cr content is preferably 0.1 at %, more preferably 0.5 at %, and further preferably at 1.0 at %.

A preferable upper limit of Mn content is 9.0 at % as described above. The upper limit of Mn content is more preferably 6.0 at %, and further preferably 5.0 at %. A lower limit of Mn content is preferably 0.1 at %, more preferably 0.5 at %, and further preferably at 1.0 at %.

A preferable upper limit of Fe content is 49.0 at % as described above. The upper limit of Fe content is more preferably 30.0 at %, further preferably 15.0 at %, and furthermore preferably 10.0 at %. A lower limit of Fe content is preferably 0.1 at %, more preferably 0.5 at %, and further preferably at 1.0 at %.

A preferable upper limit of Co content is 49.0 at % as described above. The upper limit of Co content is more preferably 30.0 at %, further preferably 15.0 at %, and furthermore preferably 10.0 at %. A lower limit of Co content is preferably 0.1 at %, more preferably 0.5 at %, and further preferably at 1.0 at %.

A preferable upper limit of Ni content is 9.0 at % as described above. The upper limit of Ni content is more preferably 5.0 at %, and further preferably 2.0 at %. A lower limit of Ni content is preferably 0.1 at %, more preferably 0.5 at %, and further preferably at 1.0 at %.

A preferable upper limit of Zn content is 29.0 at % as described above. The upper limit of Zn content is more preferably 27.0 at %, and further preferably 25.0 at %. A lower limit of Zn content is preferably 0.1 at %, more preferably 0.5 at %, and further preferably at 1.0 at %.

A preferable upper limit of Al content is 49.0 at % as described above. The upper limit of Al content is more preferably 30.0 at %, further preferably 15.0 at %, and furthermore preferably 10.0 at %. A lower limit of Al content is preferably 0.1%, more preferably 0.5 at %, and further preferably at 1.0 at %.

A preferable upper limit of Si content is 49.0 at % as described above. The upper limit of Si content is more preferably 30.0 at %, further preferably 15.0 at %, and furthermore preferably 10.0 at %. A lower limit of Si content is preferably 0.1 at %, more preferably 0.5 at %, and further preferably at 1.0 at %.

A preferable upper limit of B content is 5.0 at %. The lower limit of B content is preferably 0.01 at %, more preferably 0.1 at %, further preferably 0.5 at %, and furthermore preferably 1.0 at %.

A preferable upper limit of C content is 5.0 at %. The lower limit of C content is preferably 0.01 at %, more preferably 0.1 at %, further preferably 0.5 at %, and furthermore preferably 1.0 at %.

Preferably, the negative electrode active material contains one or more selected from the group consisting of δ phase of F-Cell structure containing site deficiency, ε phase of 2H structure containing site deficiency, η' phase of monoclinic crystal containing site deficiency, and a phase having $DO_3$ structure containing site deficiency. Hereinafter, these δ phase, ε phase, phase, and phase having $DO_3$ structure, each containing site deficiency is also referred to as "site deficient phase". Here, "site deficiency" means a state of a crystal structure in which occupancy factor is less than 1 in a specific atomic site.

These site deficient phases include a plurality of site deficiencies in the crystal structure. These site deficiencies function as a storage site or a diffusion site of metal ions (such as Li ions). Therefore, if a negative electrode active material contains an alloy phase which becomes 2H structure after M transformation and becomes $DO_3$ structure after reverse transformation, and at least one phase among the above described site deficient phases, the volumetric discharge capacity and the cycle characteristics of the negative electrode active material are further improved.

The chemical composition of a negative electrode active material may further contain a Group 2 element and/or rare earth metal (REM) for the purpose of increasing discharge capacity. The Group 2 elements include, for example, magnesium (Mg) calcium (Ca) and the like. REMs include, for example, lanthanum (La), cerium (Ce), praseodymium (Pr), neodymium (Nd) and the like.

If a negative electrode active material contains a Group 2 element and/or REM, the negative electrode active material becomes brittle. Therefore, in the production process of the electrode, a bulk material or an ingot made of the negative electrode active material is easy to be pulverized, making it easy to produce an electrode.

The negative electrode active material may be made up of the above described specific alloy phase, or may contain the above described specific alloy phase and another active material phase which is metal ion-active. Another active material phase includes, for example, a tin (Sn) phase, a silicon (Si) phase, an aluminum (Al) phase, a Co—Sn alloy phase, a $Cu_6Sn_5$ compound phase (η' phase or η phase) and the like.

[Volume Expansion Ratio and Volume Contraction Ratio of Specific Alloy Phase]

When the above described specific alloy phase undergoes M transformation or reverse transformation following occlusion and release of metal ions, preferable volume expansion/contraction ratio of unit cell of the specific alloy phase is not more than 20%. In this case, it is possible to sufficiently relax the strain due to a volume change which occurs following occlusion and release of metal ions. The volume expansion/contraction ratio of unit cell of the specific alloy phase is more preferably not more than 10%, and further preferably not more than 5%.

The volume expansion/contraction ratio of the specific alloy phase can be measured by an in-situ X-ray diffraction during charging/discharging. To be specific, an electrode plate of negative electrode active material, a separator, a counter electrode lithium, and electrolytic solution are placed and sealed in a dedicated charge/discharge cell including a window made of beryllium which transmits X-ray, within a glove box in pure argon gas atmosphere in which moisture is controlled such that due point is not more than −80° C. Then, this charge/discharge cell is mounted onto the X-ray diffraction apparatus. After mounting, an X-ray diffraction profile of the specific alloy phase is obtained in each of an initially charged state and an initially discharged state in the course of charging and discharging. From this X-ray diffraction profile, a lattice constant of the specific alloy phase is found. From the lattice constant, it is possible to calculate the volume change ratio in consideration of crystal lattice correspondence of the specific alloy phase.

When the shape of X-ray diffraction profile changes due to full width at half maximum etc. in the charge-discharge cycling process, analysis is performed after repeating charging and discharging 5 to 20 times as needed. Then, an average value of volume change ratio is found from a plurality of X-ray diffraction profiles having high reliability.

[Analysis Method of Crystal Structure of Alloy Phase Contained by Negative Electrode Active Material]

(1) The crystal structure of the phase (including an alloy phase) contained in the negative electrode active material can be analyzed by Rietveld method based on the X-ray diffraction profile obtained by using an X-ray diffraction apparatus. To be specific, the crystal structure is analyzed by the following method.

For a negative electrode active material before use for a negative electrode, X-ray diffraction measurement is performed on the negative electrode active material to obtain measured data of X-ray diffraction profile. Based on the obtained X-ray diffraction profile (measured data), the configuration of phases in the negative electrode active material is analyzed by Rietveld method. For the analysis by Rietveld method, either of "RIETAN2000" (program name) or "RIETAN-FP" (program name) which are general-purpose analysis software is used.

(2) The crystal structure of a negative electrode active material in a negative electrode before charging in a battery is determined by the same method as that in (1). To be specific, the battery, which is in an uncharged state, is disassembled within the glove box in argon atmosphere, and the negative electrode is taken out from the battery. The negative electrode taken out is enclosed with Myler foil. Thereafter, the perimeter of the Myler foil is sealed by a thermocompression bonding machine. Then, the negative electrode sealed by the Myler foil is taken out of the glove box.

Next, a measurement sample is fabricated by bonding the negative electrode to a reflection-free sample plate (a plate of a silicon single crystal which is cut out such that a specific crystal plane is in parallel with the measurement plane) with hair spray. The measurement sample is mounted onto the X-ray diffraction apparatus and X-ray diffraction measurement of the measurement sample is performed to obtain an X-ray diffraction profile. Based on the obtained X-ray diffraction profile, the crystal structure of the negative electrode active material in the negative electrode is determined by the Rietveld method.

(3) Crystal structures of the negative electrode active material in the negative electrode after charging one to multiple times and after discharging one to multiple times are determined by the same method as that in (2).

To be specific, the battery is fully charged in a charging/discharging test apparatus. The fully charged battery is disassembled in the glove box, and a measurement sample is fabricated by a method similar to that of (2). The measurement sample is mounted onto the X-ray diffraction apparatus and X-ray diffraction measurement is performed.

Moreover, the battery is fully discharged, and the fully discharged battery is disassembled in the glove box and a measurement sample is fabricated by a method similar to that of (2) to perform X-ray diffraction measurement.

<Production Method of Negative Electrode Active Material and Negative Electrode>

The method for producing a negative electrode active material containing the above described specific alloy phase, and a negative electrode and a battery utilizing the negative electrode active material will be described.

Molten metal of a negative electrode active material containing the specific alloy phase is produced. For example, molten metal having the above described chemical composition is produced. The molten metal is produced by melting starting material by an ordinary melting method such as arc melting or resistance heating melting. Next, an ingot (bulk alloy) is produced by an ingot casting method by using the molten metal. By the above described processes, a negative electrode active material is produced.

Preferably, the negative electrode active material is produced by subjecting the molten metal to rapid solidification. This method is called a rapid solidification method. Examples of the rapid solidification method include a strip casting method, a melt-spinning method for producing ribbons, a gas atomization method, a melt spinning method for producing fibers, a water atomization method, an oil atomization method, and the like.

When processing the negative electrode active material into powder, the bulk alloy (ingot) obtained by melting is (1) cut, (2) coarsely crushed by a hammer mill etc., or (3) finely pulverized mechanically by a ball mill, an attiitor, a disc mill, a jet mill, a pin mill, and the like to adjust it into a necessary particle size. When the bulk alloy has ductility and ordinary pulverization is difficult, the bulk alloy may be subjected to cutting and pulverization by a grinder disc, which is embedded with diamond abrasive particles, and the like. When M phase due to stress induction is formed in these pulverization processes, the formation ratio thereof is adjusted as needed by appropriately combining the alloy design, heat treatment, and pulverization conditions thereof. When powder generated by an atomization method can be used as melted or as heat treated, there may be cases where no pulverization process is particularly needed. Moreover, when melted material is obtained by a strip casting method and crushing thereof is difficult due to its ductility, the melted material is adjusted to have a predetermined size by being subjected to mechanical cutting such as shearing. Moreover, in such a case, the melted material may be heat treated in a necessary stage, to adjust the ratio between M phase and a matrix phase, and the like.

When a negative electrode active material is heat treated to adjust the constitution ratio of the specific alloy phase, etc., the negative electrode active material may be rapidly cooled as needed after being retained at a predetermined temperature for a predetermined time period in inert atmosphere. In this occasion, the cooling rate may be adjusted by selecting a quenching medium such as water, salt water, and oil according to the size of the negative electrode active material, and setting the quenching medium to a predetermined temperature.

<Production Method of Negative Electrode>

A negative electrode using a negative electrode active material relating to an embodiment of the present invention can be produced by a method well known to those skilled in the art.

For example, a binder such as polyvinylidene fluoride (PVDF), polymethyl methacrylate (PMMA), polytetrafluoroethylene (PTFE), and styrene-butadiene rubber (SBR) is admixed to powder of a negative electrode active material of an embodiment of the present invention, and further carbon material powder such as natural graphite, artificial graphite, and acetylene black is admixed thereto to impart sufficient conductivity to the negative electrode. After being dissolved by adding a solvent such as N-methylpyrrolidone (NMP), dimethylformamide (DMF) and water, the binder is stirred well using a homogenizer and glass beads if necessary, and formed into a slurry. This slurry is applied on an active substance support member such as a rolled copper foil and an electrodeposited copper foil and is dried. Thereafter, the dried product is subjected to pressing. Through the above described processes, a negative electrode plate is produced.

The amount of the binder to be admixed is preferably about 5 to 10 mass % from the viewpoint of the mechanical strength and battery characteristics of the negative electrode. The support member is not limited to a copper foil. The support member may be, for example, a foil of other metals such as stainless steel and nickel, a net-like sheet punching plate, a mesh braided with a metal element wire and the like.

The particle size of the powder of negative electrode active material affects the thickness and density of electrode, that is, the capacity of electrode. The thickness of electrode is preferably as thin as possible. This is because a smaller thickness of electrode can increase the total surface area of the negative electrode active material included in a battery. Therefore, an average particle size of the powder of negative electrode active material is preferably not more than 100 μm. As the average particle size of the powder of negative electrode active material decreases, the reaction area of the powder increases, thereby resulting in excellent rate characteristics. However, when the average particle size of the powder of negative electrode active material is too small, the properties and condition of the surface of the powder change due to oxidation etc. so that it becomes difficult for lithium ions to enter into the powder. In such a case, the rate characteristics and the efficiency of charging/discharging may decline over time. Therefore, the average particle size of the powder of negative electrode active material is preferably 0.1 to 100 μm, and more preferably 1 to 50 μm.

<Production Method of Battery>

A nonaqueous electrolyte secondary battery according to the present embodiment includes a negative electrode, a positive electrode, a separator, and an electrolytic solution or electrolyte as described above. The shape of the battery may be a cylindrical type, a square shape as well as a coin type and a sheet type. The battery of the present embodiment may be a battery utilizing a solid electrolyte such as a polymer battery and the like.

The positive electrode of the battery of the present embodiment preferably contains a transition metal compound containing a metal ion as the active material. More preferably, the positive electrode contains a lithium (Li)-containing transition metal compound as the active material. An example of the Li-containing transition metal compound is $LiM_1\text{-}xM'xO_2$, or $LiM_2yM'O_4$. Where, in the chemical formulae, $0 \leq x$, $y \leq 1$, and M and M' are respectively at least one kind of barium (Ba), cobalt (Co), nickel (Ni), manganese (Mn), chromium (Cr), titanium (Ti), vanadium (V), iron (Fe), zinc (Zn), aluminum (Al), indium (In), tin (Sn), scandium (Sc) and yttrium (Y).

However, the battery of the present embodiment may use other positive electrode materials such as transition metal chalcogenides; vanadium oxide and lithium (Li) compound thereof; niobium oxide and lithium compound thereof; conjugated polymers using organic conductive substance; Shepureru phase compound; activated carbon; activated carbon fiber; and the like.

The electrolytic solution of the battery of the present embodiment is generally a nonaqueous electrolytic solution in which lithium salt as the supporting electrolyte is dissolved into an organic solvent. Examples of lithium salt include $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, $LiCl$, $LiBr$, and $LiI$. These may be used singly or in combination. The organic solvent is preferably carbonic ester, such as propylene carbonate, ethylene carbonate, ethyl methyl carbonate, dimethyl carbonate, and diethyl carbonate. However, other various kinds of organic solvents including carboxylate ester and ether are usable. These organic solvents may be used singly or in combination.

The separator is placed between the positive electrode and the negative electrode. The separator serves as an insulator. Further, the separator greatly contributes to the retention of electrolyte. The battery of the present embodiment may include a well known separator. The separator is made of, for example, polypropylene or polyethylene, which is polyolefin-based material, or mixed fabric of the two, or a porous body such as a glass filter.

Hereinafter, the negative electrode active material, the negative electrode, and the battery of the present embodiment described above will be described in more detail by using Examples. It is noted that the negative electrode active material, the negative electrode, and the battery of the present embodiment will not be limited to Examples shown below.

Example 1

Powdered negative electrode active materials, negative electrodes, and coin batteries of Inventive Examples 1 to 13 of the present invention and Comparative Example 1 were produced by the following method. Then, changes in the crystal structure of each negative electrode active material caused by charging/discharging were confirmed. Further, discharge capacity (discharge capacity per volume) and cycle characteristics of each battery were investigated.

Inventive Example 1 of the Present Invention

Production of Negative Electrode Active Material

Molten metal was produced such that the chemical composition of powdered negative electrode active material is Cu-15.5 at % Sn, that is, the chemical composition of negative electrode active material contains 15.5 at % of Sn, with the balance being Cu and impurities. To be specific, a mixture of 22.34 g of copper and 7.66 g of tin was subjected to high-frequency induction melting to produce molten metal. The molten metal was cast to produce an ingot having a diameter of about 25 mm and a height of about 7 mm.

The ingot was longitudinally cut into halves. The cut pieces of the ingot were vacuum sealed into a silica tube, and were heat treated at 720° C. for 24 hours. Next, the silica tube was broken in water with ice of 0° C., thereby causing the water with ice to enter inside the silica tube, and the ingot was rapidly cooled directly with the water with ice.

The surface of the ingot after rapid cooling was ground to remove a near-surface portion thereof. A diamond file of grit size #270 was used to pulverize the ingot after grinding into a powder form such that the particle size was not more than 45 μm. This pulverized product (powder) was used as the negative electrode active material. The chemical composition of the negative electrode active material was Cu-15.5 at % Sn. That is, the chemical composition of the negative electrode active material contained 15.5 at % of Sn, with the balance being Cu and impurities.

[Production of Negative Electrode]

The above powdered negative electrode active material, acetylene black (AB) as a conductive assistant, styrene-butadiene rubber (SBR) as a binder (2-fold dilution), and carboxymethylcellulose (CMC) as a thickening agent were mixed in a mass ratio of 75:15:10:5 (blending quantity was 1 g:0.2 g: 0.134 g: 0.067 g). Then, a kneading machine was used to produce a negative electrode compound slurry by adding distilled water to the mixture such that slurry density was 27.2%. Since the styrene-butadiene rubber was used by being diluted 2-fold with water, 0.134 g of styrene-butadiene rubber was blended when weighing.

The produced negative electrode compound slurry was applied on a copper foil by using an applicator (150 μm). The copper foil applied with the slurry was dried at 100° C. for 20 minutes. The copper foil after drying had a coating film made up of the negative electrode active material on the surface. The copper foil having the coating film was subjected to punching to produce a disc-shaped copper foil having a diameter of 13 mm. The copper foil after punching was pressed at a press pressure of 500 kgf/cm² to produce a plate-shaped negative electrode material.

[Production of Battery]

The produced negative electrode material, EC-DMC-EMC-VC-FEC as the electrolytic solution, a polyolefin separator (φ17 mm) as the separator, and a metal Li plate (φ19×1 mmt) as the positive electrode material were prepared. Thus prepared negative electrode material, the electrolytic solution, the separator, and the positive electrode material were used to produce a coin battery of 2016 type. Assembly of the coin battery was performed within a glove box in argon atmosphere.

[Determination of Crystal Structure]

The crystal structures of the powdered negative electrode active material before use for the negative electrode, the negative electrode active material in the negative electrode before initial charging, and the negative electrode active material in the negative electrode after one to multiple times of charging and discharging were determined by the following method. X-ray diffraction measurements were carried out for the target negative electrode active materials to obtain measured data. Then, based on the obtained measured data, crystal structures included in the target negative electrode active materials were determined by Rietveld method. More specifically, the crystal structures were determined by the following method.

(1) Crystal Structure Analysis of Powdered Negative Electrode Active Material Before Use in Negative Electrode X-ray diffraction measurements were carried out for the powder (not more than 45 μm) of the negative electrode active materials before use in the negative electrode to obtain measured data of X-ray diffraction profile.

To be specific, RINT1000 (product of Rigaku Co., Ltd) (rotor target maximum output 18 KW; 60 kV-300 mA, or Tube target maximum output 3 kW; 50 kV-60 mA) was used to obtain X-ray diffraction profiles of the powder of the negative electrode active materials.

Based on the obtained X-ray diffraction profiles (measured data), crystal structures of alloy phases in the negative electrode active material were analyzed by Rietveld method.

Analysis revealed that phase (2H structure) which is a kind of M phase, and $\beta_1$ phase ($DO_3$ structure) which is the matrix phase thereof were mixed in the negative electrode active material of Inventive Example 1. The matrix phase had a crystal structure in which a part of Sn site in the $DO_3$ structure is replaced by Cu. The analysis procedure will be described in detail below.

FIG. 1 is a diagram illustrating an X-ray diffraction profile of Inventive Example 1 (d) in the figure), and a simulation result by Rietveld method ((a) and (b in the figure). Literature data of powder of Cu-15.5 at % Sn is shown as a reference ((c) in the figure). The literature data is that disclosed in S. Miura, Y. Morita, N. Nakanishi, "Shape Memory Effects in Alloys," Plenum Press, N.Y. (1975) 389.

The binary system diagram of Cu—Sn is known, and Cu-15.5 at % Sn alloy is in β phase at 720° C. based on the binary system diagram. It is known that when the β phase is rapidly cooled, the crystal structure becomes $DO_3$ ordered structure.

Figure 2:
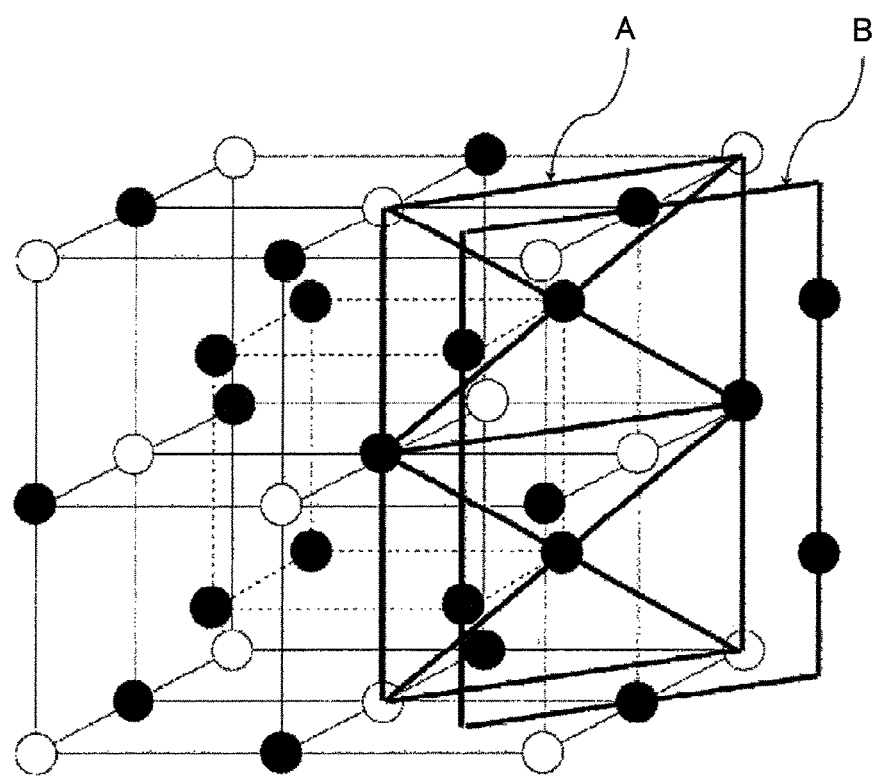
FIG. 2 is a perspective view of $DO_3$ structure.

The $DO_3$ ordered structure is an ordered structure as shown in FIG. 2. In the crystal structure of Cu-15.5 at % Sn, in FIG. 2, Cu is present at atomic sites shown by black circle, and 38 at % of Cu and 62 at % of Sn are present at atomic sites shown by white circle. It is known that such a crystal structure falls into No. 225 (Fm-3m) of International Table (Volume-A) in the classification of space group representation. The lattice constant and atomic coordinates of this space group number are as shown in Table 1.

TABLE 1

Filings:
Parent phase ($\beta_1$ Phase), Crystal Structure: $DO_3$, Composition: Cu-15.5 at % Sn
Space Group Number (International Table A): No. 225 (Fm-3m)
Lattice Constant: a = 6.05 Å

| Site Name | Atomic Species | Multiplicity/Wyckoff Symbol | Atomic Coordinates | | |
|---|---|---|---|---|---|
| | | | x | y | z |
| M1 | Cu-62 at %Sn | 4a | 0.0 | 0.0 | 0.0 |
| Cu1 | Cu | 8c | 1/4 | 1/4 | 1/4 |
| Cu2 | Cu | 4b | 1/2 | 1/2 | 1/2 |

Accordingly, with the structure model of this space group number being as the initial structure model of Rietveld analysis, a calculated value of diffraction profile (hereinafter, referred to as a calculated profile) of $\beta_1$ phase ($DO_3$ structure) of this chemical composition was found by Rietveld method. Rietan-FP (program name) was used for Rietveld analysis.

Further, it was anticipated that when an ingot was ground with a diamond file, M phase of $\gamma_1'$ was formed in the outer layer of the ingot by deformation-induced M transformation, and was mixed into the powder. Therefore, a calculated profile of the crystal structure of $\gamma_1'$ phase of this chemical composition was found as well.

The crystal structure of $\gamma_1'$ was 2H structure in the notation of Ramsdell symbol, and the space group was No. 25 (Pmm2) of International Table (Volume-A), or No. 59-2 (Pmmn) of International Table (Volume-A). The lattice constant and atomic coordinates of No. 25 (Pmm2) are shown in Table 2, and the lattice constant and atomic coordinates of No. 59-2 (Pmmn) are shown in Table 3.

TABLE 2

Filings:
M Phase ($\gamma_1'$ Phase), Crystal Structure: 2H, Composition: Cu-15.5 at % Sn
Space Group Number (International Table A): No. 25 (Pmm2)
Lattice Constants: a = 5.498 Å, b = 4.379 Å, c = 4.615 Å

| Site Name | Atomic Species | Multiplicity/Wyckoff Symbol | Atomic Coordinates | | |
|---|---|---|---|---|---|
| | | | x | y | z |
| M1 | Cu-62 at % Sn | 1a | 0.0 | 0.0 | 0.0 |
| M2 | Cu-62 at % Sn | 1d | 1/2 | 1/2 | 1/3 |
| Cu1 | Cu | 1c | 1/2 | 0.0 | 0.0 |
| Cu2 | Cu | 2e | 1/4 | 0.0 | 1/2 |
| Cu3 | Cu | 1b | 0.0 | 1/2 | 1/3 |
| Cu4 | Cu | 2f | 1/4 | 1/2 | 5/6 |

TABLE 3

Filings:
M Phase ($\gamma_1'$ Phase), Crystal Structure: 2H, Composition: Cu-15.5 at % Sn
Space Group Number (International Table A): No. 59-2 (Pmmn)
Lattice Constants: a = 4.379 Å, b = 5.498 Å, c = 4.615 Å

| Site Name | Atomic Species | Multiplicity/Wyckoff Symbol | Atomic Coordinates | | |
|---|---|---|---|---|---|
| | | | x | y | z |
| M1 | Cu-62 at % Sn | 2b | 1/4 | 3/4 | 1/6 |
| Cu1 | Cu | 2a | 1/4 | 1/4 | 1/6 |
| Cu2 | Cu | 4e | 1/4 | 0.0 | 2/3 |

No matter which space group number is selected, there is no effect on the analysis by Rietveld method. Then, a calculated profile was found by using RIETAN-FP supposing that the crystal structure of the space group number of the above describe Table 2 be the initial structure model of Rietveld analysis.

In FIG. 1, (a) shows a calculated profile of $DO_3$ structure, and (b) shows a calculated profile of 2H structure. Referring to FIG. 1, diffraction peaks of a measured X-ray diffraction profile ((d) in the figure) corresponded with those of the calculated profile of (a). Further, there were seen portions of the X-ray profile of (d), which corresponded with peaks of the calculated profile of (b). Therefore, it was confirmed that the powdered negative electrode active material of Inventive Example 1 contained $DO_3$ structure, and also contained 2H structure due to deformation-induced M transformation by a file.

It is noted that in the X-ray diffraction profile of (d), diffraction peaks that appeared in a range of diffraction angle 2θ of 37 to 48° approximately corresponded with the angle range of diffraction peaks that appeared in the measured value of the X-ray diffraction profile of the powder of Cu-15.5 at % Sn ((c) in FIG. 1) described in the literature reported by Miura et al. However, in the powder of the present Example, full width at half maximum of diffraction peaks were broadened as a result of that strain was introduced into powder particles during grinding by a diamond file.

(2) Crystal Structure Analysis of Negative Electrode Active Material in Negative Electrode The crystal structure of a negative electrode active material in a negative electrode before charging was also determined by the same method as that in (1). A measured X-ray diffraction profile was measured by the following method.

The above described coin battery, which was before being charged, was disassembled within the glove box in argon atmosphere, and a plate-shaped negative electrode was taken out from the coin battery. The negative electrode taken out was enclosed in Myler foil (manufactured by DuPont). Thereafter, the perimeter of the Myler foil was sealed by a thermocompression bonding machine. Then, the negative electrode sealed by the Myler foil was taken out of the glove box.

Next, a measurement sample was fabricated by bonding the negative electrode to a reflection-free sample plate manufactured by Rigaku Co., Ltd. (a plate of a silicon single crystal which was cut out such that a specific crystal plane was in parallel with the measurement plane) with a hair spray.

The measurement sample was mounted onto the X-ray diffraction apparatus described below in (4), and the X-ray diffraction measurement of the measurement sample was performed under measurement conditions described below in (4).

(3) Analysis of Crystal Structure of Negative Electrode Active Material in Negative Electrode after Charging and after Discharging The crystal structure of the negative electrode active material in the negative electrode after one to multiple times of charging and after one to multiple times of discharging was also determined by the same method as that in (1). Measured X-ray diffraction profiles were measured by the following method.

The above described coin battery was fully charged in a charging/discharging test apparatus. The fully charged coin battery was disassembled in the glove box, and a measurement sample was fabricated by the same method as that in (2). The measurement sample was mounted onto the X-ray diffraction apparatus described below in (4), and X-ray diffraction measurement of the measurement sample was performed under measurement conditions described below in (4).

Moreover, the above described coin battery was fully discharged. The fully discharged coin battery was disassembled in the glove box, and a measurement sample was fabricated by the same method as in (3). The measurement sample was mounted onto the X-ray diffraction apparatus described below in (4), and X-ray diffraction measurement of the measurement sample was performed at measurement conditions described below in (4).

For a negative electrode which had been subjected to charging and discharging repeatedly in a coin battery, X-ray diffraction measurement was performed by the same method.

(4) X-Ray Diffraction Apparatus and Measurement Conditions

Figure 3:
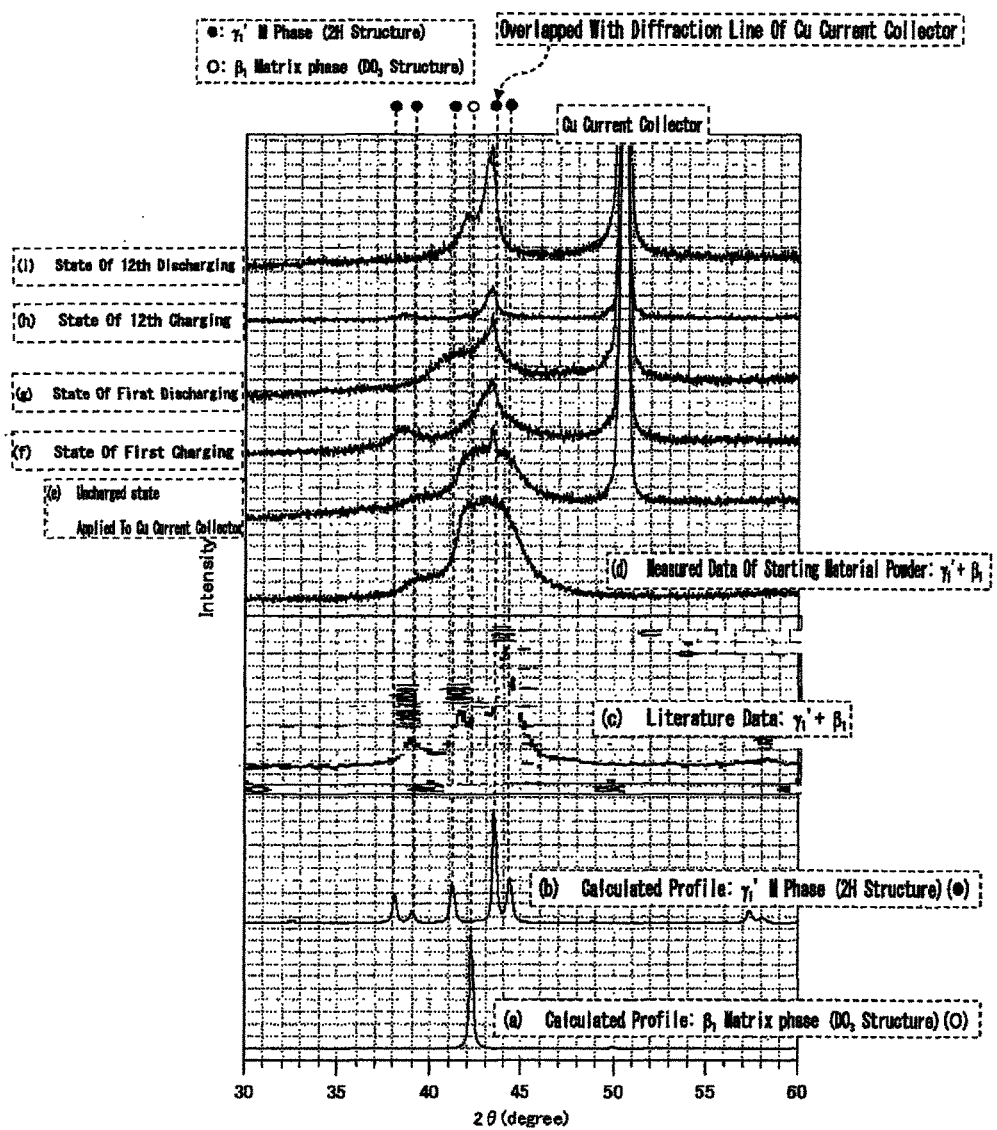
FIG. 3 is a diagram illustrating an X-ray diffraction profile of Cu-15.5 at % Sn alloy before and after charging/discharging, and a simulation result by Rietveld method.

Apparatus: RINT1000 (product name) manufactured by Rigaku Co., Ltd.
X-ray tube: Cu-Kα ray
Filter: Ni (cutting off Cu-Kβ ray)
X-ray output: 40 kV, 30 mA
Optical system: Bragg-Brentano geometry
Divergence slit: 1 degree
Scattering slit: 1 degree
Receiving slit: 0.3 mm
Monochrome receiving slit: 0.8 mm
Goniometer: RINT1000 vertical goniometer
X-ray—sample distance: 185.0 mm
Sample—receiving slit distance: 185.0 mm
X-ray—divergence slit distance: 100.0 mm
Solar slit—receiving slit distance: 54.0 mm
Monochrometer: bent graphite monochrometer
Detector: scintillation counter (SC50 type)
Scan range: 10 to 120 degree (2θ)
Scan step: 0.02 degree e(2θ)
Scan mode: time is fixed at each measurement STEP angle
Measurement time: 2 sec/STEP (5) Analysis Results of X-Ray Diffraction Measurement Data X-ray diffraction data obtained in (1), (2), and (3) are shown in FIG. 3. In FIG. 3, (d) is an X-ray diffraction profile of powder of a negative electrode active material, which was found in (1). In the figure, (e) is an X-ray diffraction profile of the negative electrode active material in the negative electrode before initial charging; (f) is an X-ray diffraction profile of the negative electrode active material after first charging; and (g) is an X-ray diffraction profile after first discharging. In the figure, (h) is an X-ray diffraction profile of the negative electrode active material after 12th charging; and (i) is an X-ray diffraction profile after 12th discharging. In FIG. 3, (a) is a calculated profile of $DO_3$ structure in the chemical composition of the present Example as with (a) in FIG. 1, and (b) in FIG. 3 is a calculated profile of 2H structure in the chemical composition of the present Example as with (b) in FIG. 1.

(5-1)

Referring to FIG. 3, the X-ray diffraction profile of (e) was the same as the X-ray diffraction profile of (d). This confirmation confirmed that there was no significant chemical reaction progressed between the negative electrode active material and the electrolytic solution.

(5-2)

X-ray diffraction profiles of the "negative electrode active material after charging" (FIG. 3 (*f*), (*h*)) and X-ray diffraction profiles of the "negative electrode active material after discharging" (FIG. 3 (g), (i)) are respectively compared with each other. The results revealed that diffraction lines reversibly changed repeatedly at a position where the diffraction angle 2θ was near 38 to 39° (position caused by M phase ($\gamma_1'$ phase))(hereinafter, referred to as an essential diffraction line position). That is, structural change was suggested.

(5-3)

Accordingly, the crystal structures of the "negative electrode active material after charging" and the "negative electrode active materials after discharging" were determined by using Rietveld method.

Figure 4A:
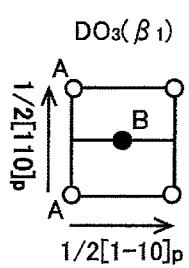
FIG. 4A is a schematic diagram of $DO_3$ structure of the matrix phase of the alloy phase of the present embodiment.
Figure 4B:
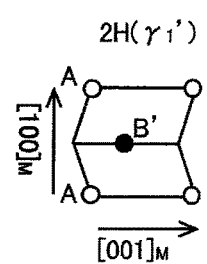
FIG. 4B is a schematic diagram of 2H structure of γ1' phase which is a kind of martensite phase.
Figure 4C:
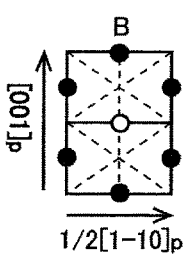
FIG. 4C is a schematic diagram of a crystal plane to explain thermoelastic diffusionless transformation from $DO_3$ structure to 2H structure.
Figure 4D:
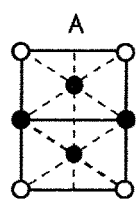
FIG. 4D is a schematic diagram of another crystal plane different from that of FIG. 4C.
Figure 4E:
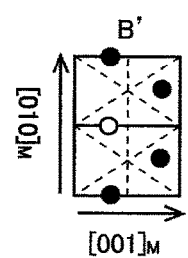
FIG. 4E is a schematic diagram of another crystal plane different from those of FIGS. 4C and 4D.

For example, explaining based on the way of taking the crystal axes shown in Table 3, in the negative electrode active material, the crystal plane A shown in FIG. 4D and the crystal plane B shown in FIG. 4C are alternately layered in the $DO_3$ structure of the matrix phase shown in FIGS. 2 and 4A. When a phase transformation occurs between the $DO_3$ structure and $\gamma_1'$ phase which is a kind of M phase, as shown in FIGS. 4A and 4B, the crystal plane B regularly undergoes shuffling due to shear stress, thereby being displaced to the position of crystal plane B'. In this case, phase transformation (M transformation) occurs without diffusion of the host lattice. In the 2H structure after M transformation, the crystal plane A shown in FIG. 4D and the crystal plane B' shown in FIG. 4E are alternately layered.

Then, it is judged whether the crystal structure of the negative electrode active material in the negative electrode of the present Example involves M transformation or not accompanied thereby (that is, involves diffusion of host lattice at the time of charging/discharging) by comparing the measured data of the X-ray diffraction profiles of the negative electrode active material after charging and after discharging, calculated profile ((a) in FIG. 3) of $\beta_1$ phase ($DO_3$ structure), and calculated profile ((b) in FIG. 3) of $\gamma_1'$ phase (2H structure).

Referring to FIG. 3, in the X-ray diffraction profile, the intensity of diffraction line near 38 to 39° increased as a result of initial charging, and decreased as a result of consecutive discharging. It can be judged that this diffraction line resulted from the formation of M phase ($\gamma_1'$) by M transformation, as will be next described, from calculated profiles ((a) and (b) in FIG. 3) of RIETAN-FP).

To be specific, as shown in (b), an intensity peak occurred at 38 to 39° of an X-ray diffraction profile, in 2H structure. On the other hand, in $DO_3$ structure ((a) in the figure), no intensity peak occurred at 38 to 39°. In contrast, in the X-ray diffraction profiles after charging ((f) and (h) in FIG. 3), an intensity peak occurred at 38 to 39°. On the other hand, in the X-ray diffraction profiles after discharging ((g) and (i) in FIG. 3), no intensity peak occurred at 38 to 39°. Further, the intensity peak at 38 to 39° did not appear in the X-ray profiles of other crystal structures (simulation result) besides 2H.

From the above, the negative electrode of the present Example contained an alloy phase which underwent M transformation to become M phase (2H structure) as a result of charging, and became a matrix phase ($DO_3$ structure) as a result of discharging. That is, the negative electrode of the present Example contained an alloy phase which underwent M transformation when occluding lithium ions which are metal ions, and underwent reverse transformation when releasing lithium ions.

This was also proved from the fact that the most intense line (see FIG. 3 (a)) of the matrix phase ($\beta_1$) appeared sharply after discharging of 12th cycle. In the negative electrode of the present Example, M transformation at the time of charging, and reverse transformation at the time of discharging were repeated.

In FIG. 3, the full width at half maximum of a diffraction line decreased along with charge-discharge cycles. From this, it is considered that occlusion and release of lithium ions relaxed strain of the negative electrode active material.

[Charge-Discharge Performance Evaluation of Coin Battery]

Next, discharge capacity and cycle characteristics of the battery of Inventive Example 1 were evaluated.

Constant current doping (corresponding to the insertion of lithium ions into electrode, and the charging of lithium ion secondary battery) was performed to a coin battery at a current value of 0.1 mA (a current value of 0.075 mA/cm$^2$) or a current value of 1.0 mA (a current value of 0.75 mA/cm$^2$) until the potential difference against the counter electrode becomes 0.005 V. Thereafter, doping capacity was measured by continuing doping against the counter electrode at a constant voltage until the current value became 7.5 μA/cm$^2$ while retaining 0.005 V.

Next, de-doping capacity was measured by performing de-doping (which corresponds to desorption of lithium ions from the electrode, and discharge of the lithium ion secondary battery) at a current value of 0.1 mA (a current value of 0.075 mA/cm$^2$) or a current value of 1.0 mA (a current value of 0.75 mA/cm$^2$) until the potential difference becomes 1.2 V.

The doping capacity and de-doping capacity correspond to charge capacity and discharge capacity when the electrode is used as the negative electrode of the lithium ion secondary battery. Therefore, the measured dope capacity was defined as the charge capacity, and a measured de-doping capacity was defined as the discharge capacity.

Charging and discharging were repeated. The doping capacity and the de-doping capacity were measure for each charging and discharging. Measured results were used to obtain charge-discharge cycle characteristics shown in FIG. 5.

Figure 5:
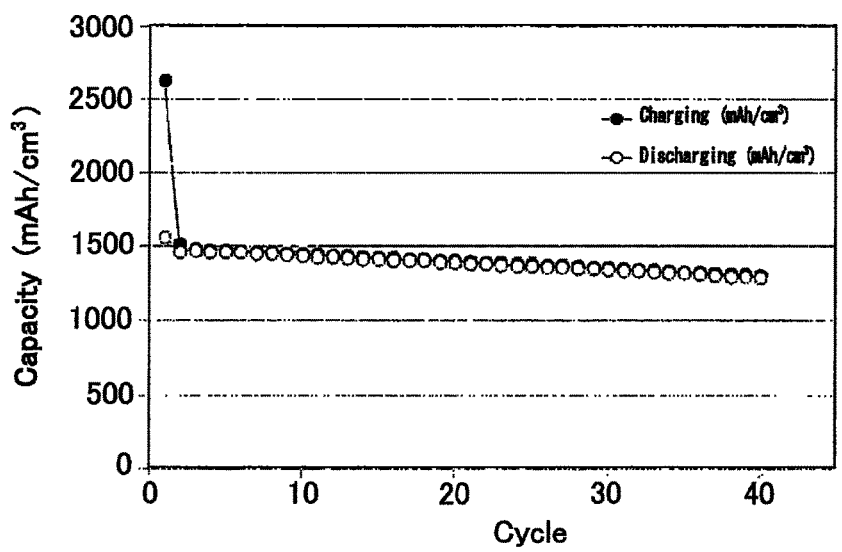
FIG. 5 is a diagram illustrating a charge-discharge cycle characteristics of Cu-15.5 at % alloy among Examples.

Referring to FIG. 5, the initial charge capacity of the coin battery of Inventive Example 1 was 2634 mAh/cm$^3$, and the discharge capacity was 1569 mAh/cm$^3$. The initial discharge capacity of a coin battery of Inventive Example 1 is about twice the theoretical capacity of graphite. Further, the discharge capacity after 40 cycles was 1304 mAh/cm$^3$, and the capacity retention ratio was as high as 83%.

From FIG. 5, the coin battery of Inventive Example 1 had stable charge-discharge cycle characteristics.

Inventive Examples 2 to 13

In Inventive Examples 2 to 13, a negative electrode active material, a negative electrode, and a coin battery were produced by the following method.

(1) Production of Negative Electrode Active Material

A mixture of multiple starting materials (elements) was subjected to high frequency melting in a silica nozzle or a nozzle made of boron nitride in argon gas atmosphere such that the final chemical composition of each negative electrode active material became the chemical composition described in the "chemical composition" column in Table 4, thereby producing molten metal. The molten metal was sprayed onto a rotating copper roll to produce a rapidly solidified foil strip. The thickness of the foil strip was 20 to 40 μm. This foil strip was pulverized with a Raikai mixer (automatic mortar) into alloy powder of not more than 45 μm. This alloy powder was used as the negative electrode active material. The final chemical composition of the negative electrode active material of each Inventive Example was as described in the "chemical composition" column in Table 4.

diffraction angle 2θ (hereinafter, referred to a specific diffraction angle range) in the X-ray diffraction profile. Moreover, after discharging, no peak was confirmed in the specific diffraction angle range. Therefore, this confirmed

TABLE 4

| Classification | | Composition | Discharge Capacity (mAh/cm³) | | Number of Cycles | Capacity Retention Ratio % | Current Value (mA) |
|---|---|---|---|---|---|---|---|
| | | | Initial Time | After Cycling | | | |
| Inventive Example | 1 | Cu—15.5 at % Sn | 1569 | 1304 | 40 | 83 | 0.1 |
| Inventive Example | 2 | Cu—1.0 at % Ti—15.5 at % Sn | 996 | 1234 | 30 | 124 | 0.1 |
| Inventive Example | 3 | Cu—1.0 at % V—15.5 at % Sn | 998 | 1119 | 13 | 112 | 0.1 |
| Inventive Example | 4 | Cu—1.0 at % Cr—15.5 at % Sn | 1375 | 1551 | 20 | 113 | 0.1 |
| Inventive Example | 5 | Cu—1.0 at % Mn—15.5 at % Sn | 1463 | 1604 | 25 | 110 | 0.1 |
| Inventive Example | 6A | Cu—1.0 at % Fe—15.5 at % Sn | 1555 | 1563 | 25 | 101 | 0.1 |
| Inventive Example | 6B | Cu—1.0 at % Fe—15.5 at % Sn | 942 | 1200 | 36 | 127 | 1.0 |
| Inventive Example | 7 | Cu—1.0 at % Co—15.5 at % Sn | 1498 | 1565 | 26 | 104 | 0.1 |
| Inventive Example | 8 | Cu—1.0 at % Ni—15.5 at % Sn | 1580 | 1559 | 29 | 99 | 0.1 |
| Inventive Example | 9 | Cu—1.0 at % Zn—15.5 at % Sn | 1008 | 1138 | 15 | 113 | 0.1 |
| Inventive Example | 10 | Cu—14.5 at % Sn—1.0 at % B | 1067 | 1168 | 15 | 109 | 0.1 |
| Inventive Example | 11 | Cu—14.5 at % Sn—1.0 at % C | 1170 | 1245 | 20 | 106 | 0.1 |
| Inventive Example | 12A | Cu—14.5 at % Sn—1.0 at % Al | 1751 | 1683 | 18 | 96 | 0.1 |
| Inventive Example | 12B | Cu—14.5 at % Sn—1.0 at % Al | 1103 | 1276 | 92 | 116 | 1.0 |
| Inventive Example | 13 | Cu—14.5 at % Sn—1.0 at % Si | 1270 | 1324 | 14 | 104 | 0.1 |
| Comparative Example | 1 | Natural Graphite | 831 | 810 | 20 | 97 | 0.1 |

Referring to Table 4, for example, the chemical composition of the powdered negative electrode active material of Inventive Example 2 was Cu-1.0 at % Ti-15.5 at % Sn. That is, the chemical composition of Inventive Example 2 contained 15.5 at % of Sn and 1.0% of Ti, with the balance being Cu and impurities. Similarly, the chemical composition of Inventive Example 3 contained 15.5 at % of Sn and 1.0% of V, with the balance being Cu and impurities.

(2) Production of Negative Electrode and Coin Battery

Negative electrodes and coin batteries were produced by the same production method as that in Inventive Example 1 by using the produced negative electrode active material of each Inventive Example.

(3) Determination of Crystal Structure and Evaluation of Cycle Characteristics

[Determination of Crystal Structure]

The crystal structure of the powdered negative electrode active material before use for the negative electrode of each of Inventive Examples 2 to 13 was determined by the same method as that in Inventive Example 1. Further, the crystal structure of the negative electrode active material in the negative electrode of each Inventive Example before initial charging was determined by the same method as that of Inventive Example 1. Further, the crystal structures of the negative electrode active material in the negative electrode of each Inventive Example after one to multiple times of charging and after one to multiple times of discharging were determined by the same method as that in Inventive Example 1, thereby confirming how the crystal structure of the negative electrode active material was changed by charging/discharging.

As a result of determination, in all of Inventive Examples, all of the crystal structures of negative electrode active material in the negative electrode after one to multiple times of discharging included $DO_3$ structure. Further, all of the crystal structures of negative electrode active material after one to multiple times of charging included 2H structure. To be specific, after one to multiple times of charging, an intensity peak was confirmed in a range of 38 to 39° of that the negative electrode active materials of Inventive Examples 2 to 13 had a crystal structure that underwent M transformation when occluding lithium ions, and underwent reverse transformation when releasing lithium ions.

[Cycle Characteristics]

Discharge capacity of a coin battery of each Inventive Example was found by the same method as that in Inventive Example 1, and cycle characteristics was evaluated. As a result, any of the initial discharge capacities of the coin batteries in Inventive Examples 2 to 13 was higher than the discharge capacity of Comparative Example 1 (negative electrode active material made of graphite) to be described below. Further, any of discharge capacities after cycles listed in Table 4 was as high as 922 mAh/cm³ or more, meaning that excellent cycle characteristics was obtained compared with conventional alloy-based negative electrode materials (refer to Table 4). In Table 4, there were Inventive Examples in which the capacity retention rate was more than 100%. This may be because, in these negative electrode active materials, as the charge-discharge cycle was repeated, Li ions were diffused into the inside of the negative electrode active material, and the proportion thereof that contributed charging/discharging increased.

It is noted that the chemical compositions of negative electrode active materials of Inventive Examples 6A and 6B were identical to each other, and also the chemical compositions of the negative electrode active materials of Inventive Examples 12A and 12B were identical to each other. In Inventive Examples 6A and 12A, the current value at the time of charging/discharging was set to 0.1 mA, and in Inventive Examples 6B and 12B, the current value at the time of charging/discharging was set to 1.0 mA. In the description below, Inventive Examples 6A and 6B are referred to together simply as "Inventive Example 6", and Inventive Examples 12A and 12B are referred to together simply as "Inventive Example 12".

Comparative Example 1

Natural graphite was used as the negative electrode active material. By using natural graphite powder as the negative electrode active material, a negative electrode and a coin battery were produced by the same production method as that in Inventive Example 1. Then, a discharge capacity was found in the same way as in Inventive Example 1.

[Test Results]

As described above, the negative electrode active materials of Inventive Examples 1 to 13 all included, after charging, 2H structure which was formed from $DO_3$ structure through M transformation, and included, after discharging, $DO_3$ structure which was formed from the 2H structure through reverse transformation.

Further, all of the initial discharge capacities of Inventive Examples 1 to 13 were higher than that of the graphite negative electrode of Comparative Example 1.

Further, the initial discharge capacities (when the current value was 0.1 mA) of Inventive Examples 6 and 12 were equal to, or not less than that of Inventive Example 1. This may be because one more kind of element was blended in the negative electrode active materials of Inventive Examples 6 and 12 compared with in the powder of the negative electrode active material of Inventive Example 1. Compared with in the negative electrode active material of Inventive Example 1, disarrangement of lattice occurred and so-called lattice defects increased in the negative electrode active materials of Inventive Examples 6 and 12. This ensured more diffusion paths and storage sites of lithium ions. As a result, it is considered that the initial capacity and the charge-discharge rate characteristics of the coin batteries of Inventive Examples 6 and 12 were improved. Improvement of the charge-discharge rate characteristics was confirmed by that Inventive Examples 6B and 12B showed excellent discharge capacities.

Example 2

Negative electrode active materials, negative electrodes, and coin batteries of Inventive Examples 14 to 53 were produced by the same method as that in Example 1. Further, negative electrode active materials, negative electrodes, and coin batteries of Comparative Examples 2 to 4 were produced. Then, the crystal structure of each Inventive Example and Comparative Example was determined, and discharge capacities (mhA/cm$^3$) of the initial time and after multiple times of charging-discharging were obtained. The results are shown in Table 5.

TABLE 5

| Classification | Composition | Discharge Capacity (mAh/cm³) Initial Time | Discharge Capacity (mAh/cm³) After Cycling | Number of Cycles | Capacity Retention Ratio % | Current Value (mA) |
|---|---|---|---|---|---|---|
| Comparative Example | 2 Cu—20.5 at % Sn | 118 | 55 | 20 | 46 | 0.1 |
| Inventive Example | 14 Cu—25 at % Sn | 2459 | 1934 | 20 | 79 | 0.1 |
| Inventive Example | 15 Cu—25 at % Sn | 1540 | 1461 | 32 | 95 | 1.0 |
| Inventive Example | 16 Cu—1 at % Ni—25 at % Sn | 2596 | 1852 | 20 | 71 | 0.1 |
| Inventive Example | 17 Cu—2 at % Ni—25 at % Sn | 2297 | 1674 | 20 | 73 | 0.1 |
| Inventive Example | 18 Cu—18.5 at % Sn | 769 | 1199 | 32 | 156 | 0.1 |
| Inventive Example | 19 Cu—1 at % Mn—25 at % Sn | 2552 | 1844 | 20 | 72 | 0.1 |
| Inventive Example | 20 Cu—2 at % Mn—25 at % Sn | 2464 | 2031 | 20 | 82 | 0.1 |
| Inventive Example | 21 Cu—5 at % Mn—25 at % Sn | 1437 | 1146 | 46 | 80 | 0.1 |
| Inventive Example | 22 Cu—10 at % Zn—25 at % Sn | 2553 | 1650 | 20 | 65 | 0.1 |
| Inventive Example | 23 Cu—5 at % Zn—25 at % Sn | 2152 | 1986 | 20 | 92 | 0.1 |
| Inventive Example | 24 Cu—10 at % Zn—25 at % Sn | 2411 | 2013 | 20 | 84 | 0.1 |
| Inventive Example | 25 Cu—15 at % Zn—25 at % Sn | 2524 | 1989 | 20 | 79 | 0.1 |
| Inventive Example | 26 Cu—20 at % Zn—25 at % Sn | 2824 | 2605 | 20 | 92 | 0.1 |
| Inventive Example | 27 Cu—20 at % Zn—25 at % Sn | 1971 | 1698 | 80 | 86 | 1.0 |
| Inventive Example | 28 Cu—25 at % Zn—25 at % Sn | 2972 | 2700 | 20 | 91 | 0.1 |
| Inventive Example | 29 Cu—25 at % Zn—25 at % Sn | 2307 | 1925 | 80 | 83 | 1.0 |
| Inventive Example | 30 Cu—2 at % Al—25 at % Sn | 2287 | 1777 | 20 | 78 | 0.1 |
| Inventive Example | 31 Cu—10 at % Al—25 at % Sn | 2512 | 2255 | 20 | 90 | 0.1 |
| Inventive Example | 32 Cu—10 at % Al—25 at % Sn | 1826 | 1487 | 80 | 81 | 1.0 |
| Inventive Example | 33 Cu—2 at % Al—23 at % Sn | 2448 | 1892 | 20 | 77 | 0.1 |
| Inventive Example | 34 Cu—5 at % Si—25 at % Sn | 2809 | 2382 | 20 | 85 | 0.1 |
| Inventive Example | 35 Cu—10 at % Si—25 at % Sn | 3073 | 2509 | 20 | 82 | 0.1 |
| Inventive Example | 36 Cu—10 at % Si—25 at % Sn | 2414 | 2024 | 40 | 84 | 1.0 |
| Inventive Example | 37 Cu—2 at % Si—23 at % Sn | 2520 | 1720 | 20 | 68 | 0.1 |
| Inventive Example | 38 Cu—2 at % Ti—25 at % Sn | 2945 | 1932 | 20 | 66 | 0.1 |
| Inventive Example | 39 Cu—5 at % Ti—25 at % Sn | 1958 | 1741 | 20 | 89 | 0.1 |
| Inventive Example | 40 Cu—2 at % Cr—25 at % Sn | 2199 | 1527 | 20 | 69 | 0.1 |
| Inventive Example | 41 Cu—5 at % Cr—25 at % Sn | 2901 | 1771 | 20 | 61 | 0.1 |
| Inventive Example | 42 Cu—10 at % Cr—25 at % Sn | 2419 | 1571 | 20 | 65 | 0.1 |
| Inventive Example | 43 Cu—2 at % Cr—23 at % Sn | 2407 | 1771 | 20 | 74 | 0.1 |
| Inventive Example | 44 Cu—2 at % Fe—25 at % Sn | 2781 | 1504 | 20 | 54 | 0.1 |
| Inventive Example | 45 Cu—5 at % Fe—2 5 at % Sn | 2506 | 1596 | 20 | 64 | 0.1 |
| Inventive Example | 46 Cu—10 at % Fe—25 at % Sn | 2522 | 1745 | 20 | 69 | 0.1 |
| Inventive Example | 47 Cu—2 at % Fe—23 at % Sn | 2178 | 1592 | 20 | 73 | 0.1 |
| Inventive Example | 48 Cu—2 at % Co—25 at % Sn | 2421 | 1690 | 20 | 70 | 0.1 |
| Inventive Example | 49 Cu—10 at % Co—15 at % Sn | 1202 | 1506 | 20 | 125 | 0.1 |
| Inventive Example | 50 Cu—2 at % V—25 at % Sn | 2266 | 1295 | 20 | 57 | 0.1 |
| Inventive Example | 51 Cu—5 at % V—25 at % Sn | 2198 | 1667 | 20 | 76 | 0.1 |
| Inventive Example | 52 Cu—10 at % V—25 at % Sn | 2413 | 1317 | 20 | 55 | 0.1 |
| Inventive Example | 53 Cu—2 at % V—25 at % Sn | 2166 | 1725 | 20 | 80 | 0.1 |
| Comparative Example | 3 Ni—50 at % Ti | 92 | 92 | 20 | 100 | 0.1 |
| Comparative Example | 4 Ni—52 at % Ti | 83 | 86 | 20 | 104 | 0.1 |
| Comparative Example | 5 Ni—25 at % Ti—50 at % Si | 495 | 416 | 20 | 84 | 0.1 |

TABLE 5-continued

| Classification | Composition | Discharge Capacity (mAh/cm³) | | Number of Cycles | Capacity Retention Ratio % | Current Value (mA) |
|---|---|---|---|---|---|---|
| | | Initial Time | After Cycling | | | |
| Comparative Example | 6 Cu—5 at % Ni—25 at % Sn | 97 | 97 | 20 | 100 | 0.1 |
| Comparative Example | 7 Cu—10 at % Mn—25 at % Sn | 157 | 53 | 20 | 34 | 0.1 |
| Comparative Example | 8 Cu—50 at % Zn—25 at % Sn | 706 | 455 | 20 | 64 | 0.1 |
| Comparative Example | 9 Cu—50 at % Al—25 at % Sn | 666 | 419 | 20 | 63 | 0.1 |
| Comparative Example | 10 Cu—50 at % Si—25 at % Sn | 1395 | 175 | 20 | 13 | 0.1 |
| Comparative Example | 11 Cu—10 at % Ti—25 at % Sn | 240 | 296 | 20 | 124 | 0.1 |
| Comparative Example | 12 Cu—5 at % Cr—25 at % Sn | 230 | 421 | 20 | 183 | 0.1 |
| Comparative Example | 13 Cu—50 at % Fe—25 at % Sn | 314 | 168 | 20 | 53 | 0.1 |
| Comparative Example | 14 Cu—50 at % Co—15 at % Sn | 423 | 300 | 20 | 71 | 0.1 |
| Comparative Example | 15 Cu—50 at % V—25 at % Sn | 343 | 215 | 20 | 63 | 0.1 |

Initial Time: the value of the cycle at which capacity started to be stabilized, among 1st to 4th cycles is adopted.

Referring to Table 5, each of Inventive Examples and Comparative Examples will be described.

Inventive Example 14

A mixture in which Cu and Sn were mixed was prepared. As with Inventive Examples 2 to 13, the prepared mixture was subjected to high-frequency induction melting in a silica nozzle or a nozzle made of boron nitride in argon atmosphere, thereby producing molten metal. The molten metal was sprayed onto a rotating copper roll, thereby producing a rapidly solidified foil strip. The thickness of the foil strip was 20 to 40 μm. This foil strip was pulverized with a Raikai mixer (automatic mortar) into alloy powder of not more than 45 μm. This alloy powder was used as the negative electrode active material.

The final chemical composition of the negative electrode active material of Inventive Example 14 was Cu-25 at % Sn. That is, the chemical composition of Inventive Example 14 contained 25 at % of Sn, with the balance being Cu and impurities.

By using the produced negative electrode active material of the present Inventive Example, a negative electrode and a coin battery were produced by the same method as that of Inventive Example 2.

[Determination of Crystal Structure]

The crystal structure of the powdered negative electrode active material before use in the negative electrode of Inventive Example 14 was determined by the same method as that of Inventive Example 1. Moreover, the crystal structure of the negative electrode active material in the negative electrode of each Inventive Example before initial charging was determined by the same method as that of Inventive Example 1. Further, the crystal structures of the negative electrode active material in the negative electrode of each Inventive Example after initial charging, after initial discharging, after multiple times of charging, after multiple times of discharging were determined by the same method as that of Inventive Example 1, thereby confirming how the crystal structure of the negative electrode active materials was changed by charging/discharging.

Hereinafter, the method of determining crystal structures of a powdered negative electrode active material before use in a negative electrode, a negative electrode active material in a negative electrode before charging, a negative electrode active material after one to multiple times of charging and discharging will be described in detail.

(1) Analysis of Crystal Structure of Powdered Negative Electrode Active Material Analysis of the crystal structure of powder (not more than 45 μm) of negative electrode active material was performed by X-ray diffraction measurement. To be specific, SmartLab manufactured by Ligaku Co., Ltd. (maximum output of rotor target 9 KW; 45 KV-200 mA) was used to acquire an X-ray diffraction profile of the powder of negative electrode active material. Then, as with Inventive Example 1, the configuration of phases of the negative electrode active substance alloy was analyzed by Rietveld method (using RIETAN2000 and RIETAN-FP).

Figure 6:
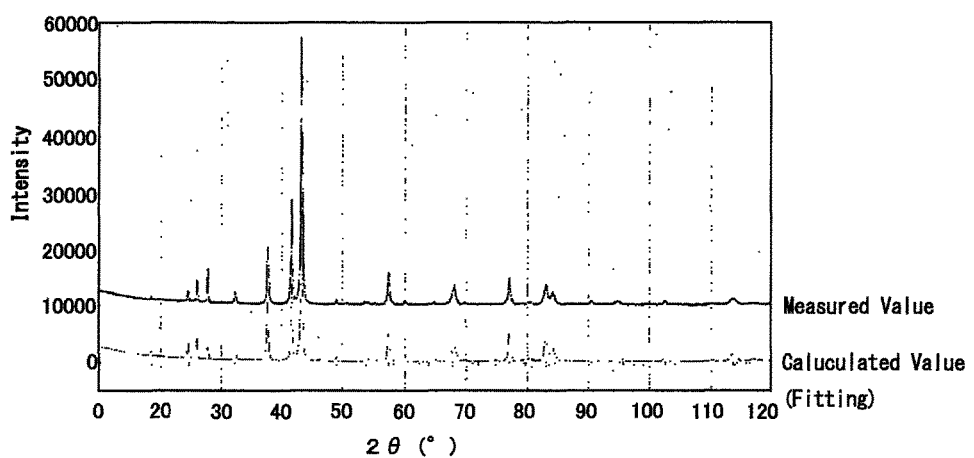
FIG. 6 is a diagram illustrating an X-ray diffraction profile of Cu-25.0 at % Sn alloy, and a simulation result by Rietveld method.

FIG. 6 is a diagram illustrating a measured X-ray diffraction profile and a profile fitting result (calculated profile) by Rietveld method. Referring to FIG. 6, the powdered negative electrode active material of Inventive Example 14 contained ε phase having the same structure as that of phase (2H structure) which is a kind of M phase.

That is, in the present Inventive Example, the crystal structure of martensite phase after rapid cooling was 2H structure. That crystal structure was the same as 2H structure shown in FIG. 4B. The result of Rietveld analysis revealed that the lattice constants of 2H structure of Inventive Example 14 were as follows: a=4.339 Å, b=5.524 Å, and c=4.758 Å, in the manner of taking crystal axes of the space group shown in Table 3.

(2) Crystal Structure Analysis of Negative Electrode Active Substance Alloy Before Charging A measurement sample was fabricated by the same method as that of Inventive Example 1. Then, the measurement sample was mounted to the X-ray diffraction apparatus described below in (4), and X-ray diffraction measurement of the measurement samples was performed under the measurement conditions described below in (4).

(3) Measurement/Analysis Method of Crystal Structure of Negative Electrode Active Substance Alloy after Charging and after Discharging Measurement samples were fabricated by the same method as that in (2) described above with the above described coin batteries being fully charged or fully discharged in a charge-discharge test apparatus. Then, the measurement sample was mounted to the X-ray diffraction apparatus described below in (4), and X-ray diffraction measurement of measured sample was performed under the measurement conditions described below in (4).

(4) X-Ray Diffraction Apparatus and Measurement Conditions
Apparatus: SmartLab manufactured by Rigaku Co., Ltd.
X-ray tube: Cu-Kα ray
X-ray output: 40 kV, 200 mA
Incident monochrometer: Johannson type crystal (which filters out Cu-Kα$_2$ ray and Cu-Kβ ray)
Optical system: Bragg-Brentano geometry
Incident parallel slit: 5.0 degrees
Incident slit: ½ degrees
Length limiting slit: 10.0 mm
Receiving slit 1: 8.0 mm
Receiving slit 2: 13.0 mm
Receiving parallel slit: 5.0 degrees
Goniometer: SmartLab goniometer
X-ray source—mirror distance: 90.0 mm
X-ray source—selection slit distance: 114.0 mm
X-ray source—sample distance: 300.0 mm
Sample—receiving slit 1 distance: 187.0 mm
Sample—receiving slit 2 distance: 300.0 mm
Receiving slit 1-receiving slit 2 distance: 113.0 mm
Sample—detector distance: 331.0 mm
Detector: D/Tex Ultra
Scan range: 10 to 120 degrees
Scan step: 0.02 degrees
Scan mode: Continuous scan
Scanning speed: 2 degrees/min

[Analysis of X-Ray Diffraction Measurement Data]

By using measured values of X-ray diffraction profiles obtained in (2) and (3), fitting was performed by Rietveld analysis, and crystal structures were determined by the same method as that of Inventive Example 1. Then, how the crystal structure of negative electrode active material was changed by charging/discharging was confirmed.

As a result of determination, the crystal structure of the negative electrode active material before charging was the same 2H structure as in FIG. 6. However, as charging and discharging were repeated, the negative electrode active material after charging included 2H structure, and the negative electrode active material after discharging included DO$_3$ structure.

To be Specific, after one to multiple times of charging, an intensity peak was confirmed in a range of 38 to 39° of diffraction angle 2θ (specific diffraction angle range), and after discharging, no intensity peak was confirmed in the specific diffraction angle range. Thus, this continued that the negative electrode active material of Inventive Example 14 had a crystal structure that underwent M transformation when occluding lithium ions, and underwent reverse transformation when releasing lithium ions.

[Charge-Discharge Performance Evaluation of Coin Battery]

Discharge capacity of the coin battery of each Inventive Example was found by the same method as that of Inventive Example 1, and cycle characteristics was evaluated. Where, as shown in Table 5, the current value at the time of charging/discharging was 0.1 mA in Inventive Example 14.

Referring to Table 5, the initial discharge capacity of the coin battery was 2459 mAh/cm$^3$, and was higher than that of the negative electrode active material made of graphite. Further, the discharge capacity was 1934 mAh/cm$^3$ after 20 cycles of charging and discharging, and the capacity retention ratio was as high as 79%, exhibiting excellent cycle characteristics.

Inventive Example 15

Inventive Example 15 had the same negative electrode active material, negative electrode, and battery as those of Inventive Example 14. In Inventive Example 15, the current value at the time of charging/discharging when measuring discharge capacity was 1.0 mA as shown in Table 5.

As a result of the measurement, the initial discharge capacity was 1540 mAh/cm$^3$, and was higher than in the case of graphite. Further, the discharge capacity after 80 cycles of charging and discharging was 1461 mAh/cm$^3$, and the capacity retention rate was as high as 95%. Therefore, the battery of Inventive Example 15 had excellent charge-discharge rate characteristics.

Inventive Examples 16 and 17

A negative electrode active material of each Inventive Example was produced by the same production method as that of Inventive Example 2. The chemical compositions of the produced negative electrode active materials were as shown in Table 5. The produced negative electrode active materials were used to produce negative electrodes and coin batteries by the same method as that of Inventive Example 2.

The crystal structure of the powdered negative electrode active material before use in the negative electrode of each Inventive Example described above was determined by the same method as that of Inventive Example 14. Further, crystal structures of the negative electrode active material in the negative electrode of each Inventive Example after one to multiple times of charging, and after one to multiple times of discharging were determined by the same method as that of Inventive Example 14, thereby confirming how the crystal structure of the negative electrode active material was changed by charging/discharging.

As a result of determination, in all of Inventive Examples, all of the crystal structures of negative electrode active material in the negative electrode after one to multiple times of discharging included DO$_3$ structure. Further, all of the crystal structures of negative electrode active material after one to multiple times of charging included 2H structure. Therefore, this confirmed that the negative electrode active materials of Inventive Examples 16 to 17 had a crystal structure that underwent M transformation when occluding lithium ions, and underwent reverse transformation when releasing lithium ions.

Further, the discharge capacity of the coin battery of each Inventive Example was found by the same method as that of Inventive Example 14, thereby evaluating the cycle characteristics thereof. Where, the current value at the time of charging and discharging was as shown in Table 5.

Referring to Table 5, the initial discharge capacity of the coin battery was higher than that of a negative electrode active material made of graphite. Further, the capacity retention ratio after passage of the number of cycles shown in Table 5 was as high as not less than 50%, exhibiting excellent cycle characteristics.

Inventive Example 18

A negative electrode active material whose chemical composition was Cu-18.5 at % Sn was produced by the same method as that of Inventive Example 2. Further, a negative electrode and a coin battery were produced by the same method as that of Inventive Example 2.

Measurement and analysis of the powder (not more than 45 μm) of the negative electrode active material were performed by the same method as that of Inventive Example 14.

Figure 7:
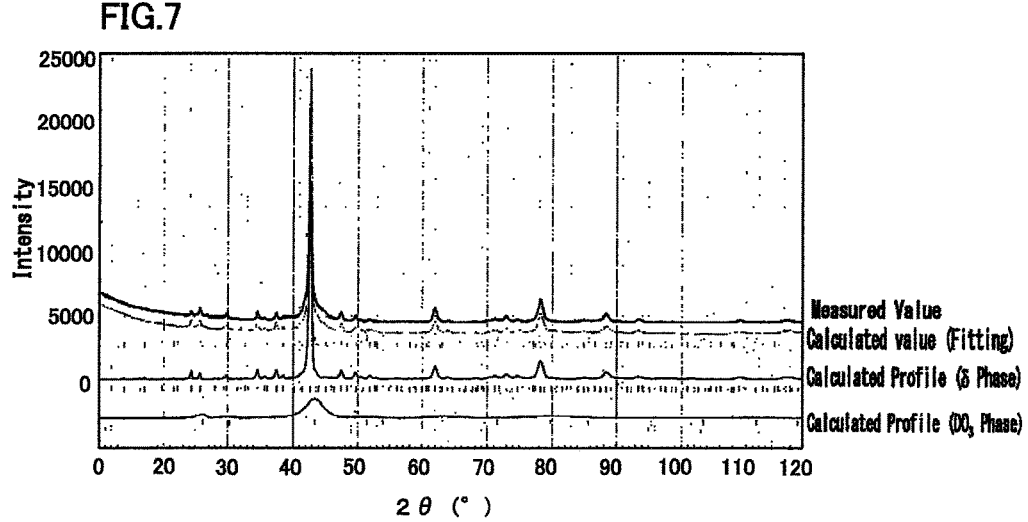
FIG. 7 is a diagram illustrating an X-ray diffraction profile of Cu-18.5 at % Sn alloy, and a simulation result by Rietveld method.

As a result, the negative electrode active substance alloy was identified to be δ phase having F-cell structure and a phase having $DO_3$ structure which is a kind of matrix phase. FIG. 7 is a diagram illustrating measured data of an X-ray diffraction profile of Inventive Example 18, and a profile fitting result (calculated profiles) by Rietveld method. Rietan-2000 was used for Rietveld analysis.

The quantitative analysis by Rietveld method shown in FIG. 7 resulted in that the negative electrode active material of Inventive Example 18 contained 80 mass % of δ phase of F-cell structure, and 20 mass % of matrix phase of $DO_3$ structure. That is, the crystal structure of the negative electrode active material of Inventive Example 18 contained $DO_3$ structure.

The fact that the diffraction profile of the matrix phase was broadened indicated that strain had been introduced into the negative electrode active material.

Further, the crystal structures of the negative electrode active material in the negative electrode of Inventive Example 18 after one to multiple times of charging, and after one to multiple times of discharging were determined by the same method as that of Inventive Example 1 to confirm how the crystal structure of the negative electrode active material was changed by charging/discharging.

The result of determination revealed that all of the crystal structures of the negative electrode active material in the negative electrode after one to multiple times of discharging included $DO_3$ structure. Further, all of the crystal structures of the negative electrode active material after one to multiple times of charging included 2H structure. Thus, this confirmed that the negative electrode active material of Inventive Example 18 had a crystal structure that underwent M transformation when occluding lithium ions, and underwent reverse transformation when releasing lithium ions.

[Charge-Discharge Performance Evaluation of Coin Battery]

Discharge capacity and capacity retention ratio were measured as with Inventive Example 14. As a result, as shown in Table 5, the initial discharge capacity of Inventive Example 18 was 769 mAh/cm$^3$, and was equal to that of the negative electrode active material made of graphite. However, the discharge capacity after 20 cycles of charging and discharging was 1199 mAh/cm$^3$, and the capacity retention ratio after 20 cycles increased to 156% (see Table 5).

Since the matrix phase having $DO_3$ structure functioned as a negative electrode active substance in Inventive Example 18, an initial discharge capacity of an equal level to that of graphite was achieved. Further, it was considered that δ phase of F-cell structure functioned as a diffusion phase of lithium ions.

Table 6 shows results of Rietveld analysis of Inventive Example 18.

TABLE 6

δ Phase ($Cu_{41}Sn_{11}$) Cubic structure (Cubic; F-cell)
Composition: Cu—20.5 at % Sn
Space Group Number (International Table A): No.216 (F-43m)
Lattice Constants: a = 17.9585 Å (After Refinement)

| Site | Element | Multiplicity Wyck. | Atomic Coordinates x | y | z | Occupancy factor |
|---|---|---|---|---|---|---|
| AIT | Cu | 16e | 0.0913 | 0.0913 | 0.2631 | 0.793511 |
| BIT | Sn | 16e | 0.0916 | 0.0916 | 0.768 | 0.56419 |
| CIT | Cu | 16e | 0.1465 | 0.1465 | 0.0278 | 0.628305 |
| DIT | Cu | 16e | 0.1562 | 0.1562 | 0.5186 | 1.0 |
| AOT | Sn | 16e | 0.0691 | 1/4 | 1/4 | 0.504753 |
| BOT | Cu | 16e | 0.5759 | 1/4 | 1/4 | 1.0 |
| COT | Cu | 16e | 0.1765 | 0.0 | 0.0 | 0.743324 |
| DOT | Cu | 16e | 0.3237 | 0.0 | 0.0 | 0.886338 |
| AOH | Cu | 24f | 0.0504 | 0.0504 | 0.0504 | 0.343304 |

TABLE 6-continued

δ Phase ($Cu_{41}Sn_{11}$) Cubic structure (Cubic; F-cell)
Composition: Cu—20.5 at % Sn
Space Group Number (International Table A): No.216 (F-43m)
Lattice Constants: a = 17.9585 Å (After Refinement)

| Site | Element | Multiplicity Wyck. | Atomic Coordinates x | y | z | Occupancy factor |
|---|---|---|---|---|---|---|
| BOH | Cu | 24g | 0.1664 | 0.1664 | 0.1664 | 1.0 |
| COH | Cu | 24f | 0.3062 | 0.3062 | 0.3062 | 0.656257 |
| DOH | Sn | 24g | 0.4113 | 0.4113 | 0.4113 | 0.740892 |
| ACO | Cu | 48h | 0.5573 | 0.5573 | 0.5573 | 1.0 |
| BCO | Cu | 48h | 0.6657 | 0.6657 | 0.6657 | 0.711665 |
| CCO | Cu | 48h | 0.8005 | 0.8005 | 0.8005 | 1.0 |
| DCO | Cu | 48h | 0.9166 | 0.9166 | 0.9166 | 1.0 |

Structure Model Reference: Booth, Acta Crystallographica, B, 33, 1977, 30

As shown in Table 6, many of site occupancy factors in the long-period ordered structure were smaller than in normal F-Cell structure shown in Comparative Example 2 described below, indicating that many site deficiencies occurred. Therefore, it is considered that δ phase of F-Cell structure functioned as a diffusion site of lithium ions.

A chief cause why the capacity increased during cycling may be that the proportion of capacity which was born by the active material phase increased along with the number of cycles.

Inventive Examples 19 to 22

A negative electrode active material of each Inventive Example was produced by the same production method as that of Inventive Example 2. The chemical compositions of the produced negative electrode active materials were as shown in Table 5. The produced negative electrode active materials were used to produce negative electrodes and coin batteries by the same method as that of Inventive Example 2.

The crystal structure of the powdered negative electrode active material before use in the negative electrode of each Inventive Example described above was determined by the same method as that of Inventive Example 14. Further, crystal structures of the negative electrode active material in the negative electrode of each Inventive Example after initial charging, after initial discharging, after multiple times of charging, and after multiple times of discharging were determined by the same method as that of Inventive Example 14, thereby confirming how the crystal structure of the negative electrode active material was changed by charging/discharging.

The determination resulted in that in all of Inventive Examples, the crystal structure of negative electrode active material in the negative electrode after one to multiple times of discharging included $DO_3$ structure. Further, all of the crystal structures of the negative electrode active material after one to multiple times of charging included 2H structure. Thus, this confirmed that the negative electrode active material of Inventive Examples 19 to 22 had a crystal structure that underwent M transformation when occluding lithium ions and underwent reverse transformation when releasing lithium ions.

Further, discharge capacity of the coin battery of each Inventive Example was found by the same method as that of Inventive Example 14, thereby evaluating the cycle characteristics thereof. It is noted that the current value at the time of charging and discharging was as shown in Table 5.

Referring to Table 5, the initial discharge capacity of the coin battery was higher than that of a negative electrode active material made of graphite. Further, the capacity retention ratio after passage of the number of cycles shown in Table 5 was as high as not less than 50%, exhibiting excellent cycle characteristics.

Inventive Example 23

A negative electrode active material whose chemical composition was Cu-5.0 at % Zn-25 at % Sn was produced by the same method as that of Inventive Example 2. Further, a negative electrode and a coin battery were produced by the same method as that of Inventive Example 2.

Measurement and analysis of crystal structure of the powder (not more than 45 μm) of the negative electrode active material were performed by the same method as that of Inventive Example 14.

Figure 8:
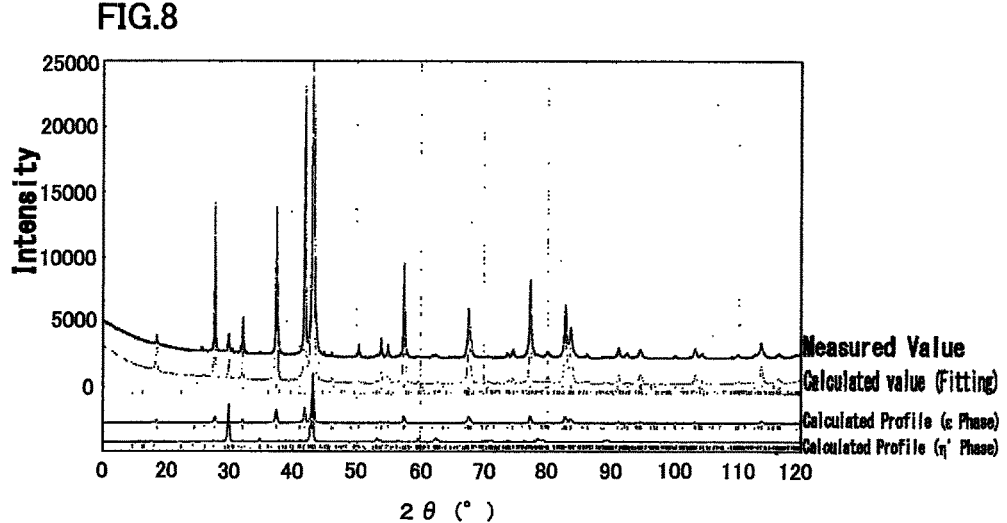
FIG. 8 is a diagram illustrating an X-ray diffraction profile of Cu-5.0 at % Zn-25.0 at % Sn alloy, and a simulation result by Rietveld method.

The result revealed that in the structure of the negative electrode active material, ε phase of 2H structure and η' phase of monoclinic structure were identified. FIG. 8 is a diagram illustrating measured data of an X-ray diffraction profile of Inventive Example 23, and profile fitting results (calculated profiles) by Rietveld method. Rietan-2000 was used for Rietveld analysis.

As a result of quantitative analysis by Rietveld method shown in FIG. 8, the structure of the present Inventive Example included 97 mass % of phase of 2H structure and 3 mass % of phase of monoclinic structure. Further, regarding ε phase of 2H structure, the result of Rietveld analysis revealed that under a preposition that the site of Cu be replaced by Zn, atomic deficiencies occurred in some part of atomic sites of Cu and Sn. In FIG. 8, the reason why intensities of diffraction lines near 32.3° and near 37.5° had increased was presumably due to these site deficiencies. As a result of Rietveld analysis, due to such site deficiencies, the site occupancy factor was 53% at 4e site of Cu and Zn, and the site occupancy factor was 52% at 2b site of Sn (see Table 7).

TABLE 7

ε Phase Orthorombic Structure Composition:
Cu—5 at % Zn—25 at % Sn
Space Group Number (International Table A): No.59-2 (Pmmn)
Lattice Constants: a = 4.317 Å, b = 5.545 Å,
c = 4.793 Å (After Refinement)

| Site | Element | Multiplicity Wyck. | Atomic Coordinates x | y | z | Occupancy factor |
|---|---|---|---|---|---|---|
| M2 | Cu—6.67 at % Zn | 4e | 1/4 | 0.0 | 2/3 | 0.53 |
| Sn1 | Sn | 2b | 1/4 | 3/4 | 1/6 | 0.52 |
| M1 | Cu—6.67 at % Zn | 2a | 1/4 | 1/4 | 1/6 | 1.0 |

Structure Model Reference: Burkhardt, Zeitschrift für metallkunde, 50, 1959, 442

As a reference, a result of Rietveld analysis of η' phase is shown in Table 8.

TABLE 8

η' Phase (Cu$_6$Sn$_5$) Monoclinic
Structure Composition: Cu—44.6 at % Sn
Space Group Number (International Table A): No. 15 (C2/c)
Lattice Constants: a = 11.1016 Å, b = 7.25028 Å, c = 9.90445 Å,
β = 98.8° (After Refinement)

| Site | Element | Multiplicity Wyck. | Atomic Coordinates x | y | z | Occupancy factor |
|---|---|---|---|---|---|---|
| Cu2 | Cu | 8f | 0.1938 | 0.00404 | 0.39028 | 1.0 |
| Sn2 | Sn | 8f | 0.2852 | 0.34501 | 0.35792 | 1.0 |
| Sn1 | Sn | 8f | 0.3911 | 0.1625 | 0.02867 | 1.0 |
| Cu1 | Cu | 8f | 0.399 | 0.02703 | 0.29764 | 1.0 |
| Sn3 | Sn | 4e | 0 | 0.20108 | 1/4 | 1.0 |

TABLE 8-continued

η' Phase (Cu$_6$Sn$_5$) Monoclinic
Structure Composition: Cu—44.6 at % Sn
Space Group Number (International Table A): No. 15 (C2/c)
Lattice Constants: a = 11.1016 Å, b = 7.25028 Å, c = 9.90445 Å,
β = 98.8° (After Refinement)

| Site | Element | Multiplicity Wyck. | Atomic Coordinates x | y | z | Occupancy factor |
|---|---|---|---|---|---|---|
| Cu4 | Cu | 4e | 0 | 0.8398 | 1/4 | 1.0 |
| Cu3 | Cu | 4a | 0 | 0 | 0 | 1.0 |

Structure Model Reference: Larsson, Acta Crystallographica, B, 50, 1994, 636

Further, crystal structures of the negative electrode active material in the negative electrode of Inventive Example 23 after one to multiple times of charging and discharging were determined by the same method as that of Inventive Example 14, thereby confirming how the crystal structure of the negative electrode active material was changed by charging/discharging.

The result of the determination revealed that the crystal structure was dominantly 2H structure before initial charging as shown in FIG. 8. However, the crystal structure changed in the course of charging and discharging, and a diffraction line of DO$_3$ structure was recognized in the X-ray diffraction profile after discharging. Thus, this confirmed that the negative electrode active material of Inventive Example 23 had a crystal structure that underwent M transformation when occluding lithium ions, and underwent reverse transformation when releasing lithium ions.

The discharge capacity of the coin battery was measured by the same method as that of Inventive Example 14. The result revealed that referring to Table 5, the discharge capacity was 2152 mAh/cm$^3$ initially and 1986 mAh/cm$^3$ after 20 cycles of charging and discharging, and the capacity retention ratio was 92%.

In the present Inventive Example, it is considered that a small amount of phase, in addition to ε phase of 2H structure, functioned as negative electrode active substance, thereby achieving discharge capacity. It is also considered that a site deficiency of the ε phase also functioned as a storage site and a diffusion site of lithium ions.

Inventive Example 24

Powder of the negative electrode active material having the chemical composition shown in Table 5 was produced by the same method as that of Inventive Example 2. Further, a negative electrode and a coin battery were produced by the same method as that of Inventive Example 2.

Measurement and analysis of crystal structure of the powder (not more than 45 μm) of the negative electrode active material were performed by the same method as that of Inventive Example 14. The result revealed that in the negative electrode active material, a phase having DO$_3$ structure which is a kind of matrix phase, η' phase of monoclinic structure, δ phase having F-cell structure, and Sn phase were mixedly present.

Figure 9:
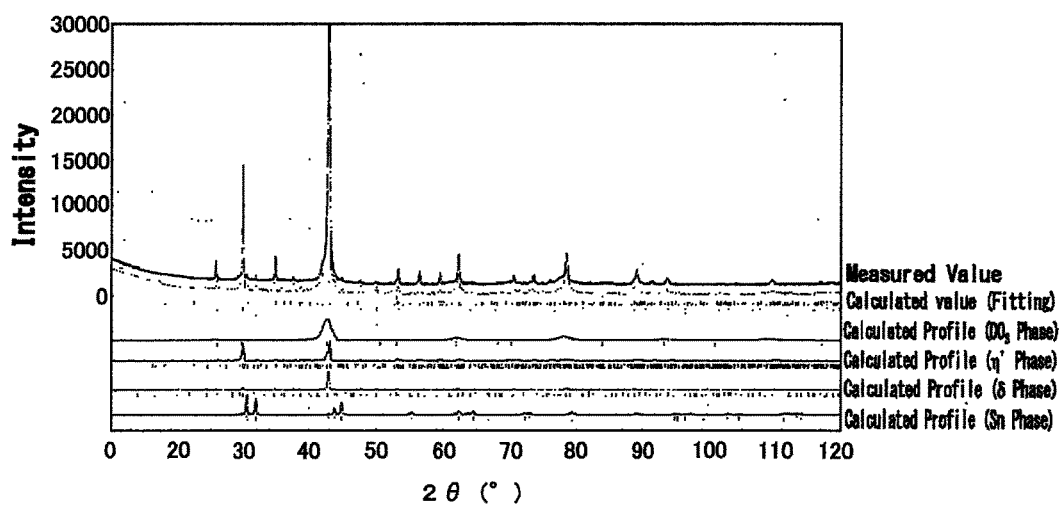
FIG. 9 is a diagram illustrating an X-ray diffraction profile of Cu-10.0 at % Zn-25.0 at % Sn alloy, and a simulation result by Rietveld method.

FIG. 9 is a diagram illustrating X-ray diffraction profiles thereof (measured data, and calculated profiles of the phase having DO3 structure, η' phase, δ phase, and Sn phase) along with a profile fitting result by Rietveld method. Rietan-2000 was used for Rietveld analysis.

The result of quantitative analysis by Rietveld method shown in FIG. 9 revealed that the negative electrode active material of Inventive Example 24 contained 31.5 mass % of a phase having $DO_3$ structure, 21.5 mass % of η' phase of monoclinic structure, 46.0 mass % of δ phase having F-cell structure, and 1.0 mass % of Sn phase.

Table 9 shows a result of Rietveld analysis of the phase having $DO_3$ structure, Table 10 shows that of η' phase, and Table 11 shows that of δ phase having F-Cell structure.

TABLE 9

β₁ Phase ($DO_3$) Cubic Structure
Space Group Number (International Table A): No. 225 (Fm-3m)
Lattice Constant: a = 5.992 Å (After Refinement)

| Site | Element | Multiplicity Wyck. | Atomic Coordinates x | y | z | Occupancy factor |
|---|---|---|---|---|---|---|
| M2 | Cu—13.3% Zn | 8c | 0.0 | 0.0 | 0.0 | 1.0 |
| M2 | Cu—13.3% Zn | 4b | 1/2 | 1/2 | 1/2 | 0.31 |
| Sn1 | Sn | 4a | 1/4 | 1/4 | 1/4 | 1.0 |

Structure Model Reference ($Fe_3Al$; $DO_3$): Ilyushin, J. Solid State Chem. 17, 1976, 385

TABLE 10

η' Phase ($Cu_6Sn_5$) Momoclinic Structure
Space Group Number (International Table A): No. 15 (C2/c)
Lattice Constant: a = 11.101 Å, b = 7.250 Å,
c = 9.904 Å, β = 98.83° (After Refinement)

| Site | Element | Multiplicity Wyck. | Atomic Coordinates x | y | z | Occupancy factor |
|---|---|---|---|---|---|---|
| M2 | Cu—13.3 % Zn | 8f | 0.1938 | 0.00404 | 0.39028 | 1.0 |
| Sn2 | Sn | 8f | 0.28518 | 0.34501 | 0.35792 | 0.757 |
| Sn1 | Sn | 8f | 0.39106 | 0.1625 | 0.02867 | 0.858 |
| M1 | Cu—13.3 % Zn | 8f | 0.39904 | 0.02703 | 0.29764 | 0.779 |
| Sn3 | Sn | 4e | 0.0 | 0.20108 | 1/4 | 1.0 |
| M4 | Cu—13.3 % Zn | 4e | 0.0 | 0.8398 | 1/4 | 1.0 |
| M3 | Cu—13.3 % Zn | 4a | 0.0 | 0.0 | 0.0 | 0.844 |

Structure Model Reference: Larsson, Acta Crystallographica, B, 50, 1994, 636

TABLE 11

δ Phase ($Cu_{41}Sn_{11}$) Cubic Structure (F-cell)
Space Group Number (International Table A): No.216 (F-43m)
Lattice Constant: a = 17.907 Å (After Refinement)

| Site | Element | Multiplicity Wyck. | Atomic Coordinates x | y | z | Occupancy factor |
|---|---|---|---|---|---|---|
| AIT | Cu—13.3% Zn | 16e | 0.0913 | 0.0913 | 0.2631 | 0.75 |
| BIT | Sn | 16e | 0.0916 | 0.0916 | 0.768 | 0.677 |
| CIT | Cu—13.3% Zn | 16e | 0.1465 | 0.1465 | 0.0278 | 0.921 |
| DIT | Cu—13.3% Zn | 16e | 0.1562 | 0.1562 | 0.5186 | 1.0 |
| AOT | Sn | 16e | 0.0691 | 1/4 | 1/4 | 1.0 |
| BOT | Cu—13.3% Zn | 16e | 0.5759 | 1/4 | 1/4 | 1.0 |
| COT | Cu—13.3% Zn | 16e | 0.1765 | 0.0 | 0.0 | 0.37 |
| DOT | Cu—13.3% Zn | 16e | 0.3237 | 0.0 | 0.0 | 0.608 |
| AOH | Cu—13.3% Zn | 24f | 0.0504 | 0.0504 | 0.0504 | 0.286 |
| BOH | Cu—13.3% Zn | 24g | 0.1664 | 0.1664 | 0.1664 | 1.0 |
| COH | Cu—13.3% Zn | 24f | 0.3062 | 0.3062 | 0.3062 | 0.573 |
| DOH | Sn | 24g | 0.4113 | 0.4113 | 0.4113 | 0.75 |
| ACO | Cu—13.3% Zn | 48h | 0.5573 | 0.5573 | 0.5573 | 1.0 |
| BCO | Cu—13.3% Zn | 48h | 0.6657 | 0.6657 | 0.6657 | 1.0 |
| CCO | Cu—13.3% Zn | 48h | 0.8005 | 0.8005 | 0.8005 | 1.0 |
| DCO | Cu—13.3% Zn | 48h | 0.9166 | 0.9166 | 0.9166 | 1.0 |

Structure Model Reference: Booth, Acta Crystallographica, B, 33, 1977, 30

Referring to Tables 9 to 11, it was revealed that under a preposition that the site of Cu be replaced by Zn, atomic deficiency occurred in some part of atomic sites of Cu and Sn, respectively in the phase having $DO_3$ structure, η' phase, and δ phase having F-cell structure.

Further, the crystal structures of the negative electrode active material in the negative electrode of Inventive Example 24 before initial charging, after initial charging, after initial discharging, after multiple times of charging, and after multiple times of discharging were determined by the same method as that of Inventive Example 14, thereby confirming how the crystal structure of the negative electrode active material was changed by charging/discharging.

The result of the determination revealed that the negative electrode active material before initial charging included $DO_3$ structure as shown in FIG. 9. Further, it changed in the course of charging and discharging, and a diffraction line of $DO_3$ structure was recognized again in the X-ray diffraction profile after discharging. Thus, this confirmed that the negative electrode active material of Inventive Example 23 had a crystal structure that underwent M transformation when occluding lithium ions, and underwent reverse transformation when releasing lithium ions.

The discharge capacity of the battery was measured as with Inventive Example 14. The result revealed that, as shown in Table 5, the discharge capacity of the coin battery was 2411 mAh/cm$^3$ initially and 2013 mAh/cm$^3$ after 20 cycles of charging and discharging, and the capacity retention ratio was 84%.

In the present Inventive Example, it is considered that a phase having DO$_3$ structure, phase, and Sn phase functioned as negative electrode active substance, thereby achieving discharge capacity. Moreover, it is considered that site deficiencies of the phase having DO$_3$ structure, η' phase, and δ phase having F-Cell structure also functioned as a storage site and a diffusion site of lithium ions.

Inventive Examples 25 and 26

Powders of the negative electrode active materials having the chemical compositions shown in Table 5 were produced by the same method as that of Inventive Example 2. Further, negative electrodes and coin batteries were produced by the same method as that of Inventive Example 2.

Measurement and analysis of crystal structures of the negative electrode active materials were performed by the same method as that of Inventive Example 14. The result thereof revealed that the powders and uncharged negative electrode active materials of Inventive Examples 25 and 26 included a phase having DO$_3$ structure, η' phase of monoclinic structure, δ phase having F-cell structure, and Sn phase, as with Inventive Example 24. Further, as with Inventive Example 24, the crystal structures of Inventive Examples 25 and 26 changed in the course of charging/discharging, and a diffraction line of 2H structure was recognized at the time of charging, and a diffraction line of DO$_3$ structure was recognized again in an X-ray diffraction profile after discharging. Thus, this confirmed that the negative electrode active materials of Inventive Examples 25 and 26 had a crystal structure that underwent M transformation when occluding lithium ions, and underwent reverse transformation when releasing lithium ions.

The initial discharge capacities of the coin batteries of Inventive Examples 25 and 26 were high, and the capacity retention ratios thereof were high as well (see Table 5).

In Inventive Examples 25 and 26, a phase of DO$_3$ structure, η' phase, and Sn phase functioned as negative electrode active substance, thereby achieving discharge capacity, as with Inventive Example 24. It is considered that the reason why the discharge capacities of these Inventive Examples increased more than that of Inventive Example 24 was because the proportion of Sn phase was high. It is also considered that the reason why, nevertheless, the capacity retention ratio was satisfactory as well was because the phase having DO$_3$ structure which is a peripheral phase induced martensitic transformation and reverse transformation in the course of charging and discharging thereby mitigating internal stress and thus preventing disintegration of active substance.

Inventive Example 27

Inventive Example 27 was made up of the same negative electrode active material, negative electrode, and battery as those of Inventive Example 26. In Inventive Example 27, the current value at the time of charging/discharging when measuring discharge capacity was 1.0 mA as shown in Table 5.

The discharge capacity was 1971 mAh/cm$^3$ initially and 1698 mAh/cm$^3$ after 80 cycles of charging and discharging, and the capacity retention ratio was 86% (see Table 4). Inventive Example 27 had excellent charge-discharge rate characteristics.

Inventive Example 28

Powder of the negative electrode active material having the chemical composition shown in Table 5 was produced by the same method as that of Inventive Example 2. Further, a negative electrode and a coin battery were produced by the same method as that of Inventive Example 2. The chemical composition of the negative electrode active material was Cu-25.0 at % Zn-25 at % Sn.

Crystal structure was determined by the same method as that of Inventive Example 14. As with Inventive Example 24, the result thereof revealed that the negative electrode active material of the present Inventive Example contained a phase having DO$_3$ structure, η' phase having a monoclinic structure, δ phase having F-cell structure, and Sn phase.

Further, results of X-ray diffraction and Rietveld analysis confirmed that the negative electrode active material of Inventive Example 28 had a crystal structure that underwent M transformation when occluding lithium ions, and underwent reverse transformation when releasing lithium ions.

The discharge capacity of the coin battery was 2972 mAh/cm$^3$ initially and 2700 mAh/cm$^3$ after 20 cycles of charging and discharging, and the capacity retention ratio was 91% (see Table 5).

It is considered that in the present Inventive Example, as with Inventive Example 24, a phase having DO$_3$ structure, η' phase, and Sn phase functioned as negative electrode active substance, thereby achieving discharge capacity. It is considered that the reason why the discharge capacity of the present Inventive Example increased more than that of Inventive Example 24 was because the proportion of Sn phase was high. It is also considered that the reason why, nevertheless, the capacity retention ratio was satisfactory as well was because the phase having DO$_3$ structure in the periphery of Sn phase induced martensitic transformation and reverse transformation in the course of charging and discharging thereby mitigating internal stress and thus preventing disintegration of active substance.

Inventive Example 29

The same coin battery as that of Inventive Example 28 was used to measure discharge capacity with the current value at the time of charging/discharging being set to 1.0 mA. The discharge capacity was 2307 mAh/cm$^3$ initially and 1925 mAh/cm$^3$ after 80 cycles of charging and discharging, and the capacity retention ratio was 83% (see Table 5).

Inventive Example 30

Powder of negative electrode active material was produced by the same method as that of Inventive Example 2. Further, a negative electrode and a coin battery were produced by the same method as that of Inventive Example 2. The chemical composition of the negative electrode active material was Cu-2.0 at % Al-25 at % Sn as shown in Table 5. Determination of crystal structure and evaluation of discharge capacity were performed by the same method as that of Inventive Example 14.

Results of X-ray diffraction and Rietveld analysis revealed that the structure of the negative electrode active material of Inventive Example 30 had a phase of 2H structure in which a small amount of η' phase was included.

Further, the results confirmed that the structure after discharging included $DO_3$ structure, and the structure after charging included 2H structure in the course of charging and discharging.

The discharge capacity of the present Inventive Example was 2287 mAh/cm$^3$ initially and 1777 mAh/cm$^3$ after 20 cycles of charging and discharging, and the capacity retention ratio was 78% (see Table 5). It is considered that in the present Inventive Example, ε phase of 2H structure and phase functioned as active material phases.

Inventive Example 31

Powder of negative electrode active material was produced by the same method as that of Inventive Example 2. Further, a negative electrode and a coin battery were produced by the same method as that of Inventive Example 2. The chemical composition of the negative electrode active material was Cu-10.0 at % Al-25 at % Sn as shown in Table 5. Determination of crystal structure and evaluation of discharge capacity were performed by the same method as that of Inventive Example 14.

Results of X-ray diffraction and Rietveld analysis revealed that the structure of the negative electrode active material of Inventive Example 31 had a matrix phase of $DO_3$ structure in which η' phase was included. Further, the results confirmed that the structure after discharging included $DO_3$ structure, and the structure after charging included 2H structure in the course of charging and discharging.

The discharge capacity of the present Inventive Example was 2512 mAh/cm$^3$ initially and 2255 mAh/cm$^3$ after 20 cycles of charging and discharging, and the capacity retention ratio was 81% (see Table 5). It is considered that in the present Inventive Example, the matrix phase of $DO_3$ structure and phase functioned as active material phases.

Inventive Example 32

The same coin battery as that of Inventive Example 28 was used to measure discharge capacity with the current value at the time of charging/discharging being set to 1.0 mA. The discharge capacity was 1826 mAh/cm$^3$ initially and 1487 mAh/cm$^3$ after 80 cycles of charging and discharging, and the capacity retention ratio was 81% (see Table 5).

Inventive Example 33

Powder of negative electrode active material was produced by the same method as that of Inventive Example 2. Further, a negative electrode and a coin battery were produced by the same method as that of Inventive Example 2. The chemical composition of the negative electrode active material was Cu-2.0 at % Al-23 at % Sn as shown in Table 5. Determination of crystal structure and evaluation of discharge capacity were performed by the same method as that of Inventive Example 14.

Results of X-ray diffraction and Rietveld analysis revealed that in the structure of the negative electrode active material of Inventive Example 33 before initial charging, ε phase of 2H structure was singly present. Further, the results confirmed that the structure after discharging included $DO_3$ structure, and the structure after charging included 2H structure in the course of charging and discharging.

The discharge capacity of the present Inventive Example was 2448 mAh/cm$^3$ initially and 1892 mAh/cm$^3$ after 20 cycles of charging and discharging, and the capacity retention ratio was 78% (see Table 5). In the present Inventive Example, c phase functioned as an active material phase as with Inventive Example 14.

Inventive Example 34

Powder of negative electrode active material was produced by the same method as that of Inventive Example 2. Further, a negative electrode and a coin battery were produced by the same method as that of Inventive Example 2. The chemical composition of the negative electrode active material was Cu-5.0 at % Si-25 at % Sn as shown in Table 5. Determination of crystal structure and evaluation of discharge capacity were performed by the same method as that of Inventive Example 14.

Results of X-ray diffraction and Rietveld analysis revealed that in the structure of the negative electrode active material of Inventive Example 34 before initial charging, a matrix phase of $DO_3$ structure was present substantially in a single phase. Further, the results confirmed that the structure after discharging included $DO_3$ structure, and the structure after charging included 2H structure in the course of charging and discharging.

The discharge capacity of the present Inventive Example was 2809 mAh/cm$^3$ initially and 2382 mAh/cm$^3$ after 20 cycles of charging and discharging, and the capacity retention ratio was 85% (see Table 5). In the present Inventive Example, the matrix phase of $DO_3$ structure functioned as an active material phase.

Inventive Example 35

Powder of negative electrode active material was produced by the same method as that of Inventive Example 2. Further, a negative electrode and a coin battery were produced by the same method as that of Inventive Example 2. The chemical composition of the negative electrode active material was Cu-10.0 at % Si-25 at % Sn as shown in Table 5. Determination of crystal structure and evaluation of discharge capacity were performed by the same method as that of Inventive Example 14.

Results of X-ray diffraction and Rietveld analysis revealed that the structure of the negative electrode active material of Inventive Example 35 before initial charging had a matrix phase of $DO_3$ structure in which phase and a minute amount of Sn single phase were present. Further, the results confirmed that the structure after discharging included $DO_3$ structure, and the structure after charging included 2H structure in the course of charging and discharging.

The discharge capacity of the present Inventive Example was 3073 mAh/cm$^3$ initially and 2509 mAh/cm$^3$ after 20 cycles of charging and discharging, and the capacity retention ratio was 82% (see Table 5).

In the present Inventive Example, the matrix phase of $DO_3$ structure, phase, and a minute amount of Sn single phase functioned as active material phases.

The result of Rietveld analysis revealed that in the crystal structure of η' phase, as in Table 10, many site occupancy factors were smaller than those in the crystal structure of normal phase, thus indicating that many site deficiencies occurred. Therefore, it is considered that η' phase functioned as a diffusion site of lithium ions.

Inventive Example 36

The same coin battery as that of Inventive Example 35 was used to measure discharge capacity with the current value at the time of charging/discharging being set to 1.0 mA. The discharge capacity was 2414 mAh/cm$^3$ initially and 2024 mAh/cm$^3$ after 80 cycles of charging and discharging, and the capacity retention ratio was 84% (see Table 5).

Inventive Example 37

Powder of the negative electrode active material was produced by the same method as that of Inventive Example 2. Further, a negative electrode and a coin battery were produced by the same method as that of Inventive Example 2. The chemical composition of the negative electrode active material was Cu-2.0 at % Si-23 at % Sn as shown in Table 5. Determination of crystal structure and evaluation of discharge capacity were performed by the same method as that of Inventive Example 14.

Results of X-ray diffraction and Rietveld analysis revealed that in the structure of the negative electrode active material of Inventive Example 37 before initial charging, ε phase having 2H structure was substantially singly present. Further, the results confirmed that the structure after discharging included $DO_3$ structure, and the structure after charging included 2H structure in the course of charging and discharging.

The discharge capacity of the present Inventive Example was 2520 mAh/cm$^3$ initially and 1720 mAh/cm$^3$ after 20 cycles of charging and discharging, and the capacity retention ratio was 68% (see Table 5). In the present Inventive Example, c phase functioned as an active material phase.

Inventive Examples 38 to 53

Negative electrode active materials of each Inventive Example were produced by the same production method as that of Inventive Example 2. The chemical compositions of the produced negative electrode active materials were as shown in Table 5. By using the produced negative electrode active materials, negative electrodes and coin batteries were produced by the same method as that of Inventive Example 2.

Crystal structures of the negative electrode active material of each Inventive Example after multiple times of charging and discharging were determined by the same method (X-ray diffraction and Rietveld analysis) as that of Inventive Example 14, thereby confirming how the crystal structure of the negative electrode active material was changed by charging/discharging.

The result of the determination revealed that in all of the Inventive Examples, all of the crystal structures of the negative electrode active material in the negative electrode after multiple times of discharging included $DO_3$ structure. Further, all of the crystal structures of the negative electrode active materials after multiple times of charging included 2H structure. Thus, this confirmed that the negative electrode active material of each Inventive Example had a crystal structure that underwent M transformation when occluding lithium ions, and underwent reverse transformation when releasing lithium ions.

Further, discharge capacity of the coin battery of each Inventive Example was found by the same method as that of Inventive Example 14. The current value at the time of charging/discharging was as shown in Table 5. Referring to Table 5, the initial discharge capacity (which was measured at a current value of 0.1 mA) of the coin battery was higher than that of a negative electrode active material made of graphite. Further, the capacity retention ratio after passage of the number of cycles shown in Table 5 was as high as not less than 50%, exhibiting excellent cycle characteristics.

A main cause of the increase in the capacity during cycling in Inventive Example 49 is considered that the proportion of electric capacity which was born by the active material phase increased along with the number of cycles as with Inventive Example 18.

Comparative Example 2

A powdered negative electrode active material was produced by the same method as that of Inventive Example 1. Where, heat treatment was conducted at a temperature of 550° C. As shown in Table 5, the chemical composition of the produced negative electrode active material was Cu-20.5 at % Sn. A negative electrode and a coin battery were produced by the same method as that of Inventive Example 1.

The crystal structure of the negative electrode active substance before initial charging was analyzed by the same method (X-ray analysis and Rietveld analysis) as that of Inventive Example 14.

Figure 10:
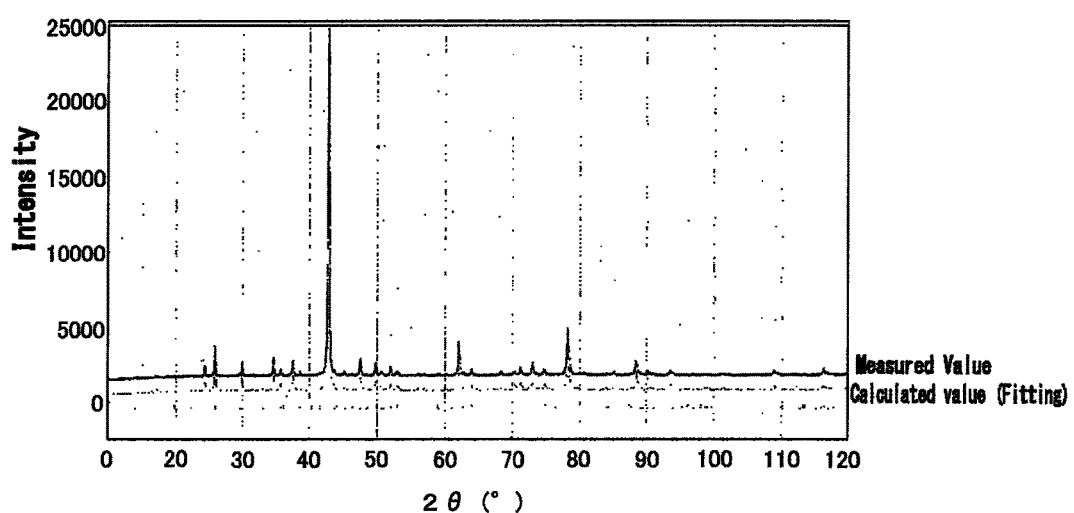
FIG. 10 is a diagram illustrating an X-ray diffraction profile of Cu-20.5 at % Sn alloy, and a simulation result by Rietveld method.

FIG. 10 is a diagram illustrating measured values of X-ray diffraction profile and a profile fitting result by Rietveld method. Rietan-FP was used for Rietveld analysis.

The chemical composition of the present Comparative Example was known as δ phase on an equilibrium diagram, and the crystal structure thereof was F-cell ordered structure shown in Table 12. This crystal structure corresponds to No. 216 (F-43m) of International Table (Volume-A) in terms of the classification of space groups. The lattice constants and atomic coordinates thereof are as shown in Table 12.

TABLE 12

δ Phase ($Cu_{41}Sn_{11}$) Cubic Structure (F-cell)
Composition: Cu—20.5 at % Sn
Space Group Number (International Table A): No.216 (F-43m)
Lattice Constant: a = 17.9585 Å (After Refinement)

| Site | Element | Multiplicity Wyck. | Atomic Coordinates x | y | z | Occupancy factor |
|---|---|---|---|---|---|---|
| AIT | Cu | 16e | 0.0913 | 0.0913 | 0.2631 | 0.75 |
| BIT | Sn | 16e | 0.0916 | 0.0916 | 0.768 | 1.0 |
| CIT | Cu | 16e | 0.1465 | 0.1465 | 0.0278 | 1.0 |
| DIT | Cu | 16e | 0.1562 | 0.1562 | 0.5186 | 1.0 |
| AOT | Sn | 16e | 0.0691 | 1/4 | 1/4 | 1.0 |
| BOT | Cu | 16e | 0.5759 | 1/4 | 1/4 | 1.0 |
| COT | Cu | 16e | 0.1765 | 0.0 | 0.0 | 1.0 |
| DOT | Cu | 16e | 0.3237 | 0.0 | 0.0 | 1.0 |
| AOH | Cu | 24f | 0.0504 | 0.0504 | 0.0504 | 1.0 |
| BOH | Cu | 24g | 0.1664 | 0.1664 | 0.1664 | 1.0 |
| COH | Cu | 24f | 0.3062 | 0.3062 | 0.3062 | 1.0 |
| DOH | Sn | 24g | 0.4113 | 0.4113 | 0.4113 | 0.75 |
| ACO | Cu | 48h | 0.5573 | 0.5573 | 0.5573 | 1.0 |
| BCO | Cu | 48h | 0.6657 | 0.6657 | 0.6657 | 1.0 |
| CCO | Cu | 48h | 0.8005 | 0.8005 | 0.8005 | 1.0 |
| DCO | Cu | 48h | 0.9166 | 0.9166 | 0.9166 | 1.0 |

Structure Model Reference: Booth, Acta Crystallographica, B, 33, 1977, 30

The result of Rietveld analysis revealed that the crystal structure of the negative electrode active substance was F-cell ordered structure. Further, the negative electrode active substance after charging did not include 2H structure, and the negative electrode active substance after discharging did not include $DO_3$ structure.

The discharge capacity of the coin battery of Comparative Example 2 was found by the same method as that of Inventive Example 14. The current value at the time of charging/discharging was as shown in Table 5. The discharge capacity was 118 mAh/cm³ initially and 55 mAh/cm³ after 20 cycles of charging and discharging (see Table 5). As shown by the present Comparative Example, almost no charge/discharge capacity as a battery was achieved by δ phase whose crystal structure was F-cell structure.

Comparative Example 3

A powdered negative electrode active material was produced by the same method as that of Inventive Example 2. As shown in Table 5, the chemical composition of the produced negative electrode active material was Ni-50 at % Ti. A negative electrode and a coin battery were produced by the same method as that of Inventive Example 2.

The crystal structure of the negative electrode active substance before initial charging was analyzed by the same method (X-ray analysis and Rietveld analysis) as that of Inventive Example 14. The result thereof revealed that the structure of the negative electrode active substance included neither a phase of DO3 structure nor a phase of 2H structure. Further, the discharge capacity was measured in the same way as in Inventive Example 14. The result revealed that initial discharge capacity hardly showed up (see Table 5). Therefore, it is considered that Ti—Ni alloy was not lithium-active.

Comparative Example 4

A powdered negative electrode active material was produced by the same method as that of Inventive Example 2. As shown in Table 5, the chemical composition of the produced negative electrode active material was Ni-52.0 at % Ti-5 at % Si. A negative electrode and a coin battery were produced by the same method as that of Inventive Example 2.

The crystal structure of the negative electrode active substance before initial charging was analyzed by the same method (X-ray analysis and Rietveld analysis) as that of Inventive Example 14. The result revealed that the structure of the negative electrode active substance included neither a phase of $DO_3$ structure nor a phase of 2H structure. Further, the discharge capacity was measured in the same way as in Inventive Example 14. The result revealed that initial discharge capacity hardly showed up (see Table 5). Therefore, it may be because in the present Comparative Example, Silicon which can be active substance was unable to exist as a simple substance, and compounds of Si, Ti, and Ni were formed.

Comparative Example 5

A powdered negative electrode active material was produced by the same method as that of Inventive Example 2. As shown in Table 5, the chemical composition of the produced negative electrode active material was Ni-25.0 at % Ti-50 at % Si. A negative electrode and a coin battery were produced by the same method as that of Inventive Example 2.

The crystal structure of the negative electrode active substance before initial charging was analyzed by the same method (X-ray analysis and Rietveld analysis) as that of Inventive Example 14. The result revealed that the structure of the negative electrode active substance included neither a phase of $DO_3$ structure nor a phase of 2H structure. Further, the discharge capacity was measured in the same way as in Inventive Example 14. The result revealed that initial discharge capacity was merely about half of that in the case of graphite (see Table 5). Therefore, it was considered in the present Comparative Example, Silicon which can be active material was unable to be sufficiently present, because compounds of Si, Ti, and Ni were formed.

Comparative Example 6

A powdered negative electrode active material was produced by the same method as that of Inventive Example 2. As shown in Table 5, the chemical composition of the produced negative electrode active material was Cu-5 at % Ni-25 at % Sn. A negative electrode and a coin battery were produced by the same method as that of Inventive Example 2.

The crystal structure of the negative electrode active material before initial charging was analyzed by the same method (X-ray analysis and Rietveld analysis) as that of Inventive Example 14. The result revealed that the structure of the negative electrode active material included neither a phase of $DO_3$ structure nor a phase of 2H structure. Further, the discharge capacity was measured in the same way as in Inventive Example 14. The result revealed that sufficient discharge capacity was not achieved in the present Comparative Example.

Comparative Example 7

A powdered negative electrode active material was produced by the same method as that of Inventive Example 2. As shown in Table 5, the chemical composition of the produced negative electrode active material was Cu-10 at % Ni-25 at % Sn. A negative electrode and a coin battery were produced by the same method as that of Inventive Example 2.

The crystal structure of the negative electrode active substance before initial charging was analyzed by the same method (X-ray analysis and Rietveld analysis) as that of Inventive Example 14. The result thereof revealed that the structure of the negative electrode active material included neither a phase of $DO_3$ structure nor a phase of 2H structure. Further, the discharge capacity was measured in the same way as in Inventive Example 14. The result revealed that sufficient discharge capacity was not achieved in the present Comparative Example.

Comparative Example 8

A powdered negative electrode active material was produced by the same method as that of Inventive Example 2. As shown in Table 5, the chemical composition of the produced negative electrode active material was Cu-50 at % Ni-25 at % Sn. A negative electrode and a coin battery were produced by the same method as that of Inventive Example 2.

The crystal structure of the negative electrode active material before initial charging was analyzed by the same method (X-ray analysis and Rietveld analysis) as that of Inventive Example 14. The result revealed that the structure of the negative electrode active material included neither a phase of $DO_3$ structure nor a phase of 2H structure. Further, the discharge capacity was measured in the same way as in Inventive Example 14. The result revealed that sufficient discharge capacity was not achieved in the present Comparative Example.

Comparative Example 9

A powdered negative electrode active material was produced by the same method as that of Inventive Example 2.

As shown in Table 5, the chemical composition of the produced negative electrode active material was Cu-50 at % Al-25 at % Sn. A negative electrode and a coin battery were produced by the same method as that of Inventive Example 2.

The crystal structure of the negative electrode active material before initial charging was analyzed by the same method (X-ray analysis and Rietveld analysis) as that of Inventive Example 14. The result revealed that the structure of the negative electrode active material included neither a phase of $DO_3$ structure nor a phase of 2H structure. Further, the discharge capacity was measured in the same way as in Inventive Example 14. The result revealed that sufficient discharge capacity was not achieved in the present Comparative Example.

Comparative Example 10

A powdered negative electrode active material was produced by the same method as that of Inventive Example 2. As shown in Table 5, the chemical composition of the produced negative electrode active material was Cu-50 at % Si-25 at % Sn. A negative electrode and a coin battery were produced by the same method as that of Inventive Example 2.

The crystal structure of the negative electrode active material before initial charging was analyzed by the same method (X-ray analysis and Rietveld analysis) as that of Inventive Example 14. The result revealed that the structure of the negative electrode active material included neither a phase of $DO_3$ structure nor a phase of 2H structure. Further, the discharge capacity was measured in the same way as in Inventive Example 14. The result revealed that although the initial discharge capacity was high, the cycle characteristics (capacity retention ratio) were low.

Comparative Examples 11 to 15

Powdered negative electrode active materials were produced by the same method as that of Inventive Example 2. The chemical compositions of the produced negative electrode active materials of each Comparative Example were as shown in Table 5. Negative electrodes and coin batteries were produced by the same method as that of Inventive Example 2.

The crystal structure of each negative electrode active material before initial charging was analyzed by the same method (X-ray analysis and Rietveld analysis) as that of Inventive Example 14. The result revealed that the structure of each negative electrode active material included neither a phase of $DO_3$ structure nor a phase of 2H structure. Further, the discharge capacity was measured in the same way as in Inventive Example 14. The result revealed that sufficient discharge capacity was not achieved in all of each Comparative Example.

So far, embodiments of the present invention have been described. However, the above described embodiments are merely examples to carry out the present invention. Therefore, the present invention will not be limited to the above described embodiments, and can be carried out by appropriately modifying the above described embodiments within a range not departing from the spirit thereof.

The invention claimed is:

1. A negative electrode active material, comprising an alloy phase that undergoes thermoelastic diffusionless transformation either when releasing metal ions, or when occluding the metal ion, wherein
    the alloy phase undergoes the thermoelastic diffusionless transformation when occluding the metal ions, and undergoes reverse transformation when releasing the metal ions, wherein
    the alloy phase after the thermoelastic diffusionless transformation contains a crystal structure which is 2H in Ramsdell notation, and
    the alloy phase after the reverse transformation contains a crystal structure which is $DO_3$ in Strukturbericht notation, wherein
    the negative electrode active material contains 21 to 27 at % of Sn, with the balance being Cu and impurities, or
    the negative electrode active material contains:
    Sn: 10 to 35 at %, and
    one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less, with the balance being Cu and impurities.

2. The negative electrode active material according to claim 1, wherein
    the negative electrode active material further contains one or more selected from the group consisting of δ phase of F-Cell structure, ε phase, η' phase, and a phase having $DO_3$ structure, each including site deficiency.

3. A negative electrode, comprising the negative electrode active material according to claim 1.

4. A battery, comprising the negative electrode according to claim 3.

* * * * *

UNITED STATES PATENT AND TRADEMARK OFFICE
CERTIFICATE OF CORRECTION

Page 1 of 3

PATENT NO. : 10,381,640 B2
APPLICATION NO. : 14/419969
DATED : August 13, 2019
INVENTOR(S) : Yamamoto et al.

It is certified that error appears in the above-identified patent and that said Letters Patent is hereby corrected as shown below:

In the Specification

Column 5, Line 24:
"phase (M18R, structure of monoclinic crystal or $18R_2$ struc-"
Should read:
"phase ($M18R_2$ structure of monoclinic crystal or $18R_2$ struc-"

Column 7, Line 58:
"phase, ε phase, phase, and phase having $DO_3$ structure, each"
Should read:
"phase, ε phase, η' phase, and phase having $DO_3$ structure, each"

Column 13, Line 44:
"Analysis revealed that phase (2H structure) which is a"
Should read:
"Analysis revealed that $γ_1$' phase (2H structure) which is a"

Column 13, Line 51:
"of Inventive Example 1 (d) in the figure) and a simulation"
Should read:
"of Inventive Example 1 ((d) in the figure) and a simulation"

Column 13, Line 52:
"result by Rietveld method ((a) and (b in the figure). Litera-"
Should read:
"result by Rietveld method ((a) and (b) in the figure). Litera-"

Columns 21 and 22, TABLE 5:

"| Inventive Example | 22 | Cu-10 at % Zn-25 at % Sn | 2553 | 1650 | 20 | 65 | 0.1 |"

Signed and Sealed this
Second Day of June, 2020

Andrei Iancu
*Director of the United States Patent and Trademark Office*

Should read:

" | Inventive Example | 22 | Cu-1 at % Zn-25 at % Sn | 2553 | 1650 | 20 | 65 | 0.1 | "

Column 24, Line 37:
"contained ε phase having the same structure as that of phase"
Should read:
"contained ε phase having the same structure as that of $\gamma_1'$ phase"

Column 25, Line 44:
"specific diffraction angle range. Thus, this continued that the"
Should read:
"specific diffraction angle range. Thus, this confirmed that the"

Column 29, Line 23:
"Example included 97 mass % of phase of 2H structure and"
Should read:
"Example included 97 mass % of ε phase of 2H structure and"

Column 29, Line 24:
"3 mass % of phase of monoclinic structure. Further, regard-"
Should read:
"3 mass % of η' phase of monoclinic structure. Further, regard-"

Column 30, Line 39:
"small amount of phase in addition to ε phase of 2H"
Should read:
"small amount of η' phase in addition to ε phase of 2H"

Column 31, TABLE 9:

" | M2 | Cu-13.3% Zn | 4b | 1/2 | 1/2 | 1/2 | 0.31 | "

Should read:

" | M1 | Cu-13.3% Zn | 4b | 1/2 | 1/2 | 1/2 | 0.31 | "

Column 33, Line 6:
"phase having $DO_3$ structure, phase, and Sn phase functioned"
Should read:
"phase having $DO_3$ structure, η' phase, and Sn phase functioned"

Column 34, Line 66:
"material of Inventive Example 30 had a phase of 2H"
Should read:
"material of Inventive Example 30 had ε phase of 2H"

CERTIFICATE OF CORRECTION (continued)
U.S. Pat. No. 10,381,640 B2

Column 35, Line 10:
"phase functioned as active material phases."
Should read:
"η' phase functioned as active material phases."

Column 35, Line 36:
"ture and phase functioned as active material phases."
Should read:
"ture and η' phase functioned as active material phases."

Column 36, Line 2:
"Example, c phase functioned as an active material phase as"
Should read:
"Example, ε phase functioned as an active material phase as"

Column 36, Line 45:
"a matrix phase of $DO_3$ structure in which phase and a minute"
Should read:
"a matrix phase of $DO_3$ structure in which η' phase and a minute"

Column 36, Line 55:
"$DO_3$ structure, phase, and a minute amount of Sn single"
Should read:
"$DO_3$ structure, η' phase, and a minute amount of Sn single"

Column 36, Line 60:
"normal phase, thus indicating that many site deficiencies"
Should read:
"normal η' phase, thus indicating that many site deficiencies"

Column 37, Line 30:
"Example, c phase functioned as an active material phase."
Should read:
"Example, ε phase functioned as an active material phase."